United States Patent
Nishimura et al.

(10) Patent No.: US 11,743,583 B2
(45) Date of Patent: Aug. 29, 2023

(54) IMAGING APPARATUS AND SETTING SCREEN THEREOF

(71) Applicant: MAXELL, LTD., Kyoto (JP)

(72) Inventors: Ryuji Nishimura, Oyamazaki (JP); Susumu Yoshida, Oyamazaki (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 16/302,125

(22) PCT Filed: May 18, 2017

(86) PCT No.: PCT/JP2017/018706
§ 371 (c)(1),
(2) Date: Nov. 16, 2018

(87) PCT Pub. No.: WO2017/200049
PCT Pub. Date: Nov. 23, 2017

(65) Prior Publication Data
US 2019/0289201 A1 Sep. 19, 2019

(30) Foreign Application Priority Data

May 20, 2016 (JP) .................. 2016-101472
Jun. 16, 2016 (JP) .................. 2016-119951

(51) Int. Cl.
*H04N 23/667* (2023.01)
*G06F 3/04845* (2022.01)
(Continued)

(52) U.S. Cl.
CPC ....... *H04N 23/667* (2023.01); *G06F 3/04845* (2013.01); *G06F 3/04847* (2013.01);
(Continued)

(58) Field of Classification Search
CPC .. H04N 1/212; H04N 5/2258; H04N 5/23216; H04N 5/23229; H04N 5/23245;
(Continued)

(56) References Cited

U.S. PATENT DOCUMENTS 6,847,392 B1    1/2005  House
8,363,120 B2*   1/2013  Shioji ............... H04N 5/23245
                                                  348/211.9
(Continued)

FOREIGN PATENT DOCUMENTS

CN      101924879 A    12/2010
JP      9-215012 A     8/1997
(Continued)

OTHER PUBLICATIONS

Chinese Office Action received in corresponding Chinese Application No. 201780031181.6 dated Oct. 10, 2020.
(Continued)

*Primary Examiner* — Daniel M Pasiewicz
(74) *Attorney, Agent, or Firm* — Mattingly & Malur, PC

(57) ABSTRACT

It is an object to improve usability at the time of photographing or reproducing in an imaging apparatus including a plurality of imaging units. In order to achieve the above object, an imaging apparatus including a plurality of imaging units includes a setting unit that sets a plurality of photographing modes which are settable in advance, a unit that controls a plurality of imaging units in accordance with a set photographing mode, and a manipulation unit. Accordingly, it is possible to provide an imaging apparatus with excellent usability capable of controlling a plurality of imaging units independently or simultaneously such that imaging is performed with a simple manipulation when a desired photographing mode is selected by a user.

16 Claims, 24 Drawing Sheets

(51) Int. Cl.
| | | |
|---|---|---|
| *G06F 3/04847* | (2022.01) | |
| *H04N 23/62* | (2023.01) | |
| *H04N 23/69* | (2023.01) | |
| *H04N 13/00* | (2018.01) | |
| *H04N 13/20* | (2018.01) | |
| *H04N 1/21* | (2006.01) | |
| *H04N 5/33* | (2023.01) | |
| *H04N 23/45* | (2023.01) | |
| *H04N 23/57* | (2023.01) | |
| *H04N 23/66* | (2023.01) | |
| *H04N 23/80* | (2023.01) | |
| *H04N 23/63* | (2023.01) | |
| *H04N 23/698* | (2023.01) | |
| *H04N 23/53* | (2023.01) | |
| *H04N 23/67* | (2023.01) | |

(52) U.S. Cl.
CPC .............. *H04N 1/212* (2013.01); *H04N 5/33* (2013.01); *H04N 13/00* (2013.01); *H04N 13/20* (2018.05); *H04N 23/45* (2023.01); *H04N 23/57* (2023.01); *H04N 23/62* (2023.01); *H04N 23/632* (2023.01); *H04N 23/633* (2023.01); *H04N 23/66* (2023.01); *H04N 23/69* (2023.01); *H04N 23/698* (2023.01); *H04N 23/80* (2023.01); *H04N 23/531* (2023.01); *H04N 23/672* (2023.01)

(58) Field of Classification Search
CPC ....... H04N 5/232935; H04N 5/232939; H04N 5/23296; H04N 23/45; H04N 23/62; H04N 23/632; H04N 23/633; H04N 23/667; H04N 23/69; H04N 23/80; H04N 23/90; G06F 3/04845; G06F 3/04847
See application file for complete search history.

(56) References Cited

U.S. PATENT DOCUMENTS

| | | | |
|---|---|---|---|
| 10,602,063 B2* | 3/2020 | Ho | ..................... H04N 5/2258 |
| 2003/0160886 A1 | 8/2003 | Misawa et al. | |
| 2008/0024645 A1 | 1/2008 | Mizumori | |
| 2008/0107306 A1 | 5/2008 | Matsuzawa | |
| 2010/0315525 A1 | 12/2010 | Ikeda | |
| 2011/0234853 A1* | 9/2011 | Hayashi | ................. G03B 13/02 348/231.99 |
| 2011/0242369 A1* | 10/2011 | Misawa | ................. H04N 5/232 348/240.2 |
| 2012/0026364 A1 | 2/2012 | Kuma | |
| 2012/0044400 A1 | 2/2012 | Okada et al. | |
| 2012/0105579 A1* | 5/2012 | Jeon | ..................... H04N 13/239 348/38 |
| 2012/0113216 A1* | 5/2012 | Seen | ..................... H04N 13/239 348/38 |
| 2013/0107015 A1 | 5/2013 | Morioka et al. | |
| 2014/0253693 A1 | 9/2014 | Shikata | |
| 2015/0326793 A1* | 11/2015 | Makinen | ............ H04N 5/23293 348/231.4 |
| 2016/0316147 A1* | 10/2016 | Bernstein | ............... H04N 13/25 |
| 2017/0026582 A1* | 1/2017 | Kim | ................... H04M 1/0264 |
| 2018/0227489 A1* | 8/2018 | Ho | ..................... H04N 5/23218 |

FOREIGN PATENT DOCUMENTS

| | | |
|---|---|---|
| JP | 10-134187 A | 5/1998 |
| JP | 2004-207774 A | 7/2004 |
| JP | 2005-198155 A | 7/2005 |
| JP | 2010-4113 A | 1/2010 |
| JP | 2011-055246 A | 3/2011 |
| JP | 2011-119995 A | 6/2011 |
| JP | 2013-142725 A | 7/2013 |
| JP | 2013-247543 A | 12/2013 |
| JP | 2016-001853 A | 1/2016 |

OTHER PUBLICATIONS

Translation of Japanese Office Action received in corresponding Japanese Application No. 2020-096900 dated Jun. 29, 2021.
Japanese Office Action received in corresponding Japanese Application No. 2020-096900 dated Feb. 15, 2022.
Japanese Decision of Refusal Office Action received in corresponding Japanese Application No. 2020-096900 dated Oct. 25, 2022.
Japanese Decision of Dismissal of Amendment Office Action received in corresponding Japanese Application No. 2020-096900 dated Oct. 25, 2022.
International Search Report of PCT/JP2017/018706 dated Aug. 15, 2017.

* cited by examiner

F I G. 1
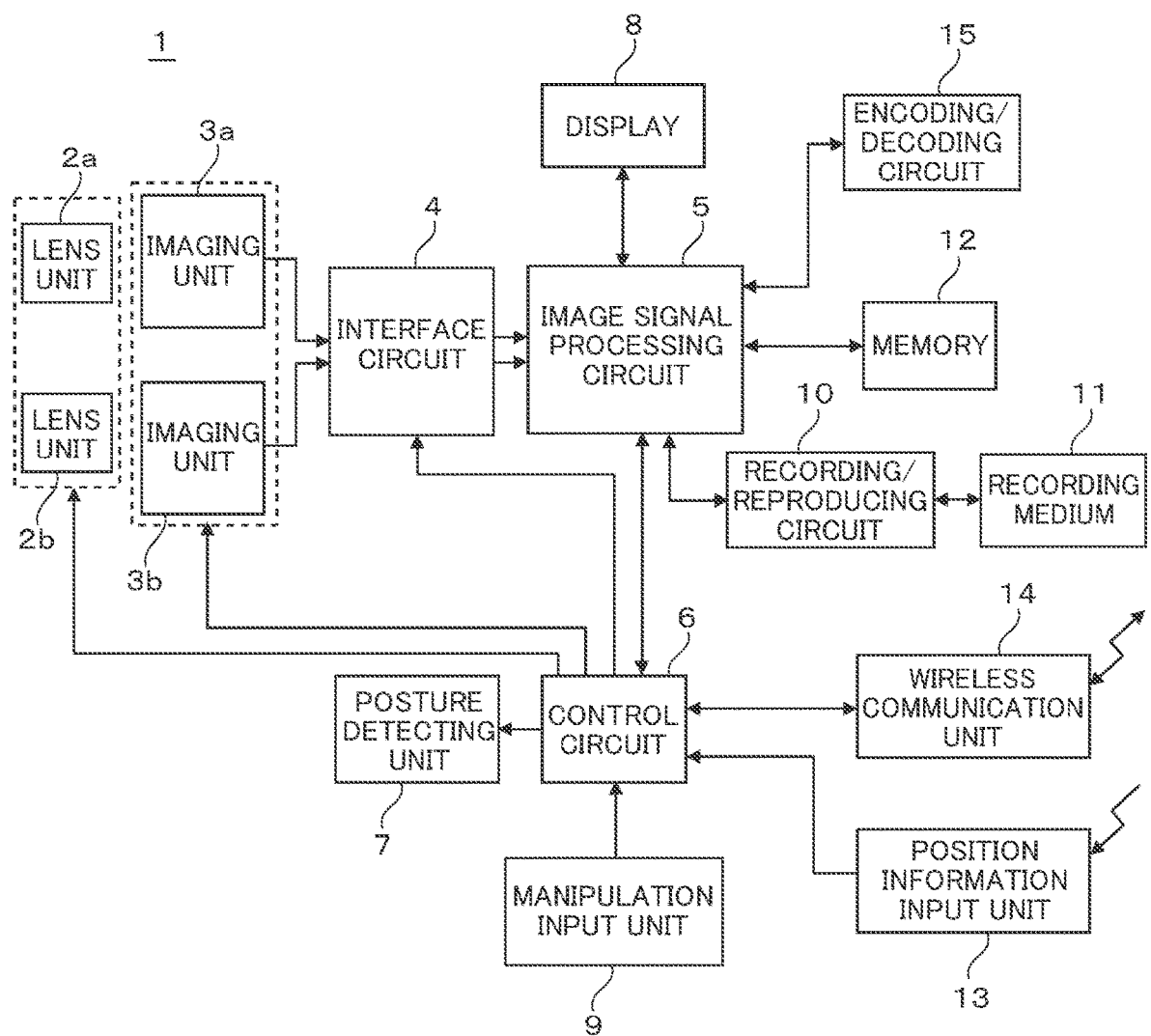

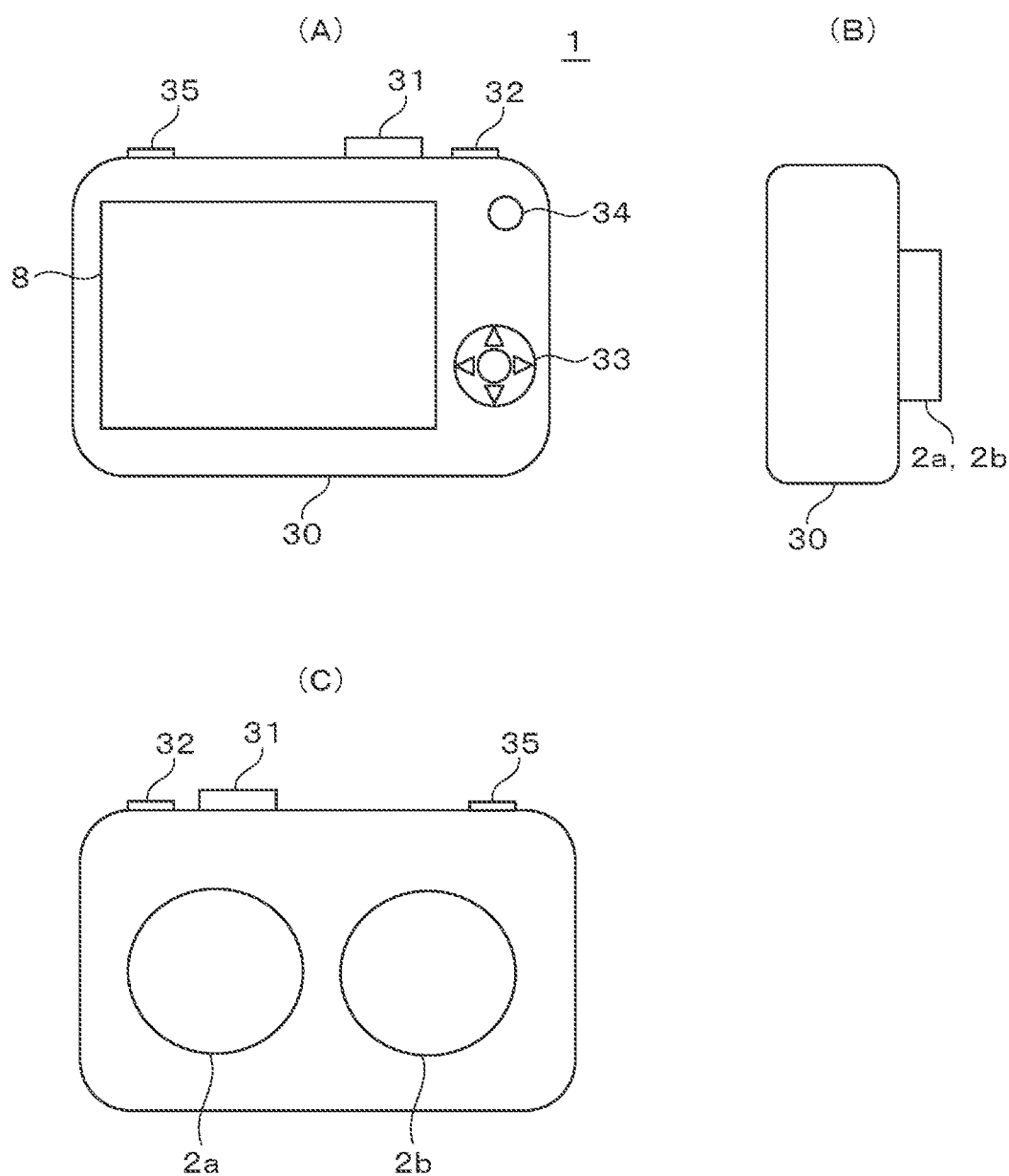

FIG. 4

PHOTOGRAPHING MODE 1

| PHOTOGRAPHING MODE | NORMAL PHOTOGRAPHING 1 | NORMAL PHOTOGRAPHING 2 | SIMULTANEOUS PHOTOGRAPHING | HIGH-SPEED CONTINUOUS PHOTOGRAPHING | MOVING IMAGE/ STILL IMAGE |
|---|---|---|---|---|---|
| FIRST IMAGING UNIT | ENABLE | ENABLE AND MONITOR | ENABLE | ENABLE | ENABLE AND MOVING IMAGE |
| SECOND IMAGING UNIT | DISABLE | ENABLE AND STILL IMAGE | ENABLE | ENABLE | ENABLE AND STILL IMAGE |
| RECORD IMAGE | FIRST | SECOND | FIRST AND SECOND | FIRST AND SECOND | FIRST AND SECOND |
| CONTROL | IMAGING BY ONLY FIRST OR SECOND IMAGING UNIT | MONITOR BY FIRST AND STILL IMAGE CAPTURING BY SECOND | SIMULTANEOUS IMAGING BY FIRST AND SECOND IMAGING UNITS | HIGH-SPEED IMAGING USING FIRST AND SECOND IMAGING UNIT ALTERNATELY | CAPTURE MOVING IMAGE BY FIRST AND CAPTURE STILL IMAGE BY SECOND |

FIG. 5

FIRST IMAGING UNIT

MOVING IMAGE OUTPUT(FOR MENTORING)

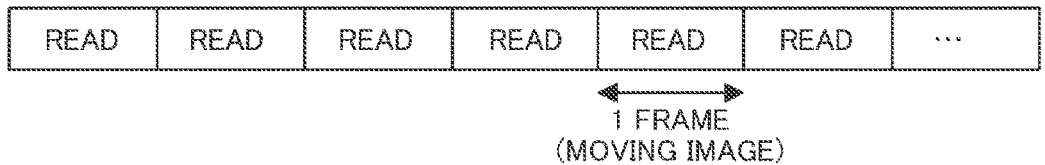

1 FRAME (MOVING IMAGE)

SECOND IMAGING UNIT

STILL IMAGE OUTPUT

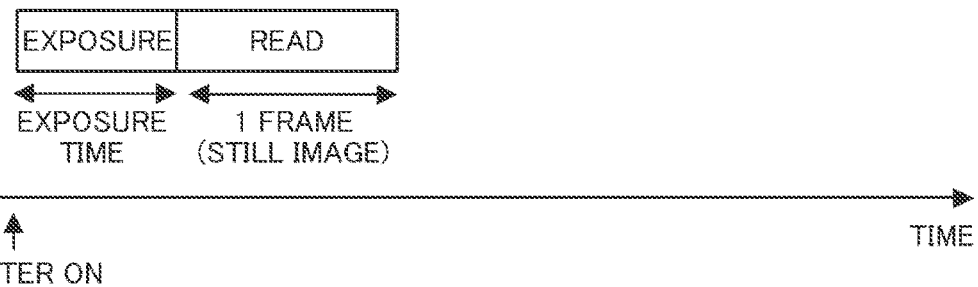

EXPOSURE TIME   1 FRAME (STILL IMAGE)

↑ SHUTTER ON            TIME →

FIG. 6

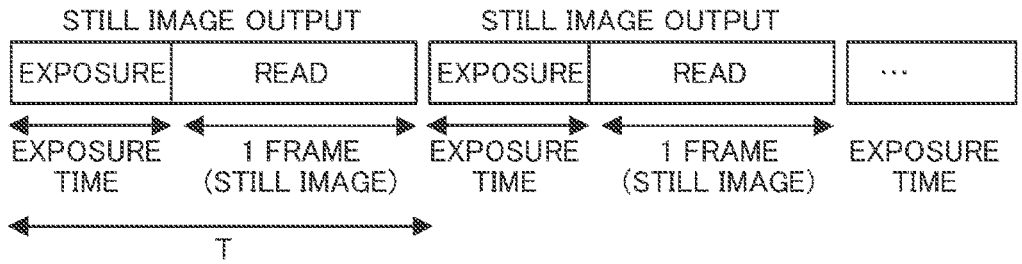

FIG. 7

PHOTOGRAPHING MODE 2

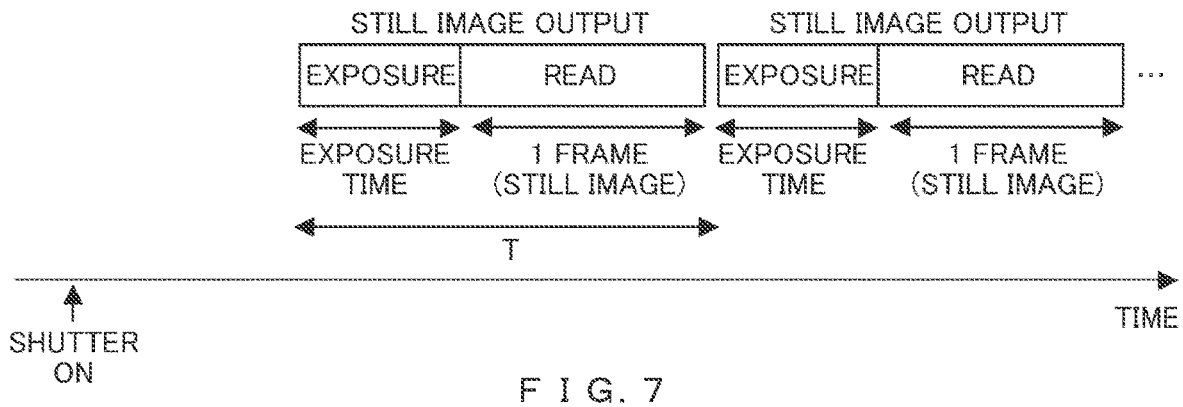

| PHOTOGRAPHING MODE | DISTANCE MEASUREMENT | BACKGROUND GRADATION | DISTANCE ADAPTATION | HDR | 3D |
|---|---|---|---|---|---|
| FIRST IMAGING UNIT | ENABLE | ENABLE | ENABLE | ENABLE HIGH DYNAMIC RANGE | ENABLE RIGHT IMAGE |
| SECOND IMAGING UNIT | ENABLE | ENABLE | ENABLE | DISABLE HIGH S/N | ENABLE LEFT IMAGE |
| RECORD IMAGE | FIRST | FIRST | FIRST | SYNTHETIC | FIRST AND SECOND |
| CONTROL | RECORD FIRST IMAGE AND DISTANCE INFORMATION OF EACH PIXEL | PROCESS OF SEPARATING FOREGROUND AND BACKGROUND ON BASIS OF DISTANCE INFORMATION BY FIRST | DIFFERENT PROCESSES AT MULTIPLE STAGES ON BASIS OF DISTANCE INFORMATION | DIFFERENT PROCESSES AT MULTIPLE STAGES ON BASIS OF DISTANCE INFORMATION | CAPTURE RIGHT IMAGE AND LEFT IMAGE FOR 3D |

FIG. 14

PHOTOGRAPHING MODE 3

| PHOTOGRAPHING MODE | PROGRAM AE | DIAPHRAGM PRIORITY | SHUTTER PRIORITY | DUAL | MANUAL |
|---|---|---|---|---|---|
| FIRST IMAGING UNIT | ENABLE PAE1 | ENABLE DIAPHRAGM 1 | ENABLE SHUTTER 1 | ENABLE P1/A1/S1 | ENABLE SETTING 1 |
| SECOND IMAGING UNIT | ENABLE PAE2 | ENABLE DIAPHRAGM 2 | ENABLE SHUTTER 2 | ENABLE P2/A2/S2 | ENABLE SETTING 2 |
| RECORD IMAGE | FIRST AND SECOND | FIRST AND SECOND | FIRST AND SECOND | FIRST AND SECOND | FIRST AND SECOND |
| CONTROL | PROGRAM AE OF EACH OF FIRST AND SECOND | DIAPHRAGM PRIORITY OF EACH OF FIRST AND SECOND | SHUTTER PRIORITY OF EACH OF FIRST AND SECOND | P/A/S OF EACH OF FIRST AND SECOND | MANUALLY SETTING OPERATIONS OF FIRST AND SECOND IMAGING UNITS INDIVIDUALLY |

FIG. 15

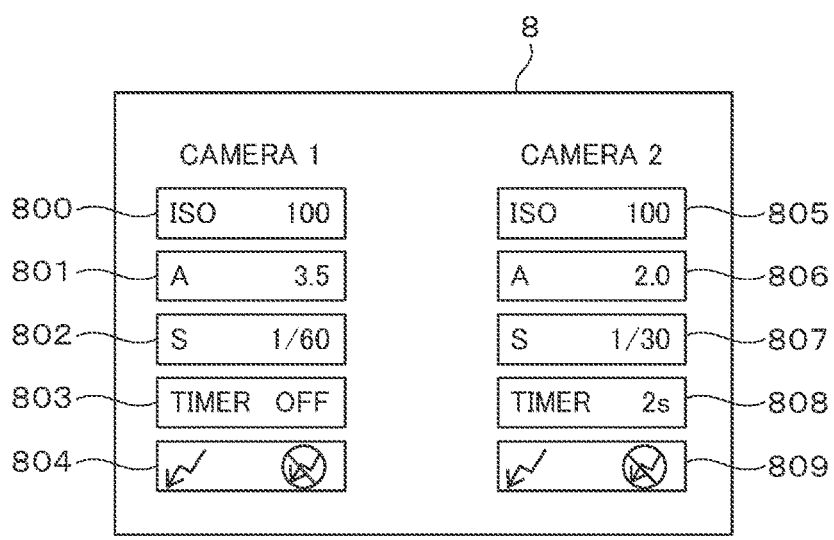

FIG. 16

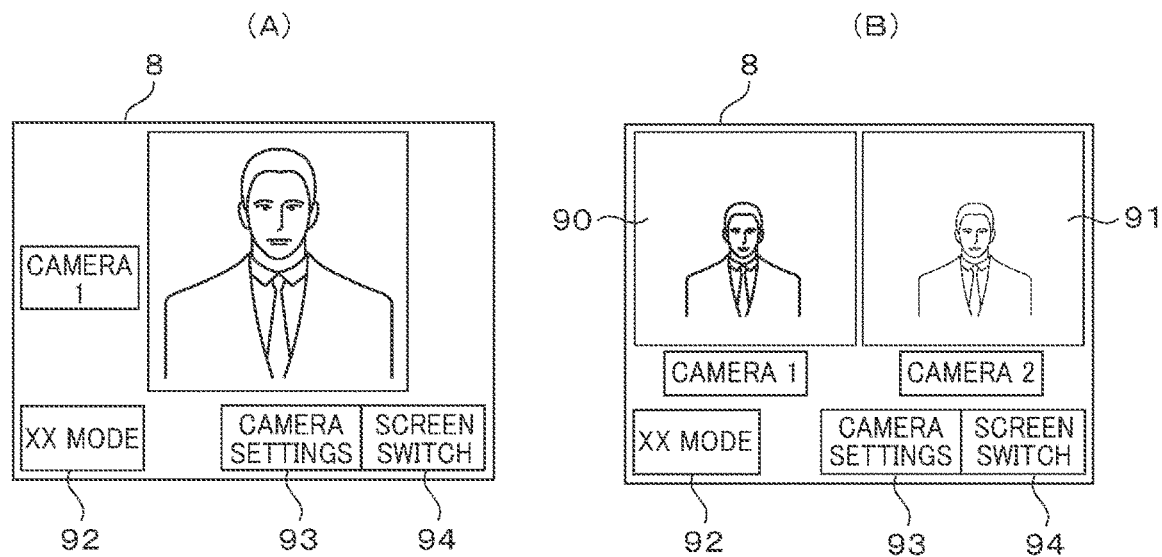

FIG. 17

IMAGING FORM

| IMAGING FORM | IMAGING/ RECOGNITION | VISIBLE/ NEAR INFRARED | TELE/WIDE | PANORAMA | PRESENCE OR ABSENCE OF OLPF |
|---|---|---|---|---|---|
| FIRST IMAGING UNIT | IMAGING | VISIBLE IMAGING | TELE | RIGHT IMAGE | PRESENCE OF LPF |
| SECOND IMAGING UNIT | RECOGNITION | NEAR INFRARED IMAGING | WIDE | LEFT IMAGE | ABSENCE OF LPF |
| RECORD IMAGE | FIRST | SYNTHETIC | FIRST AND SECOND | SYNTHETIC | FIRST AND SECOND |
| IMAGING SCHEME | IMAGING BY FIRST, IMAGE RECOGNITION BY SECOND, AND DETECTION OF AE/AF OR THE LIKE | VISIBLE LIGHT IMAGING BY FIRST AND NEAR INFRARED IMAGING BY SECOND | CAPTURE WIDE ANGLE IMAGE BY FIRST AND CAPTURE NARROW ANGLE IMAGE BY SECOND | SYNTHESIZE RIGHT IMAGE AND LEFT IMAGE WHICH DIFFER IN IMAGING RANGE | RECOGNITION PROCESS BY SECOND IMAGING UNIT |

F I G. 2 1
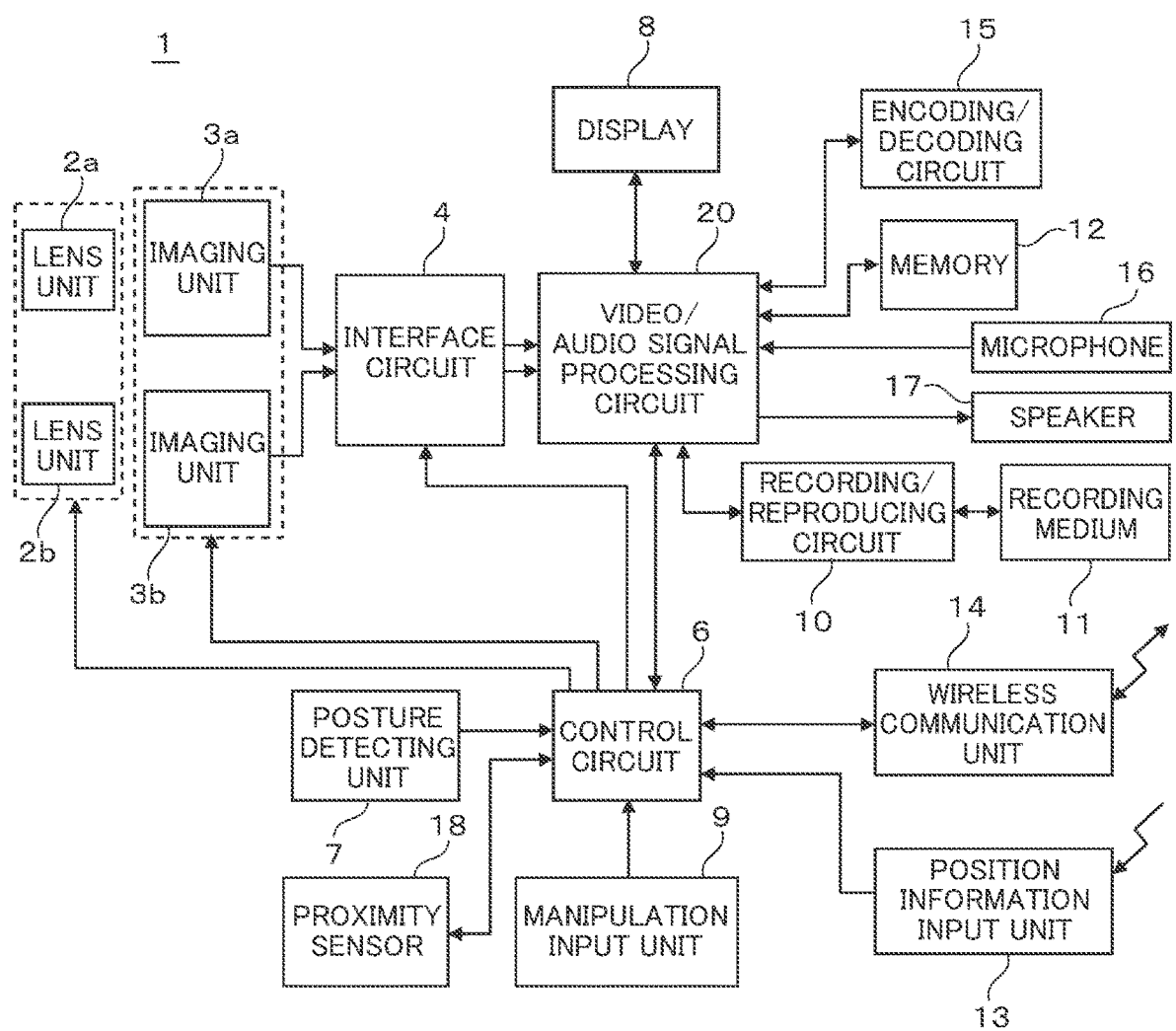

FIG. 22

NORMAL PHOTOGRAPHING MODE

| PHOTOGRAPHING MODE | MODE 1 STILL IMAGE | MODE 2 MOVING IMAGE |
|---|---|---|
| WIDE ANGLE IMAGING UNIT | STILL IMAGE CAPTURING | MOVING IMAGE CAPTURING |
| NARROW ANGLE IMAGING UNIT | STILL IMAGE CAPTURING | MOVING IMAGE CAPTURING |
| OPERATION | ARBITRARY ANGLE OF VIEW STILL IMAGE CAPTURING | ARBITRARY ANGLE OF VIEW MOVING IMAGE CAPTURING |

FIG. 23

SIMULTANEOUS PHOTOGRAPHING MODE

| PHOTOGRAPHING MODE | MODE 3 MOVING IMAGE AND STILL IMAGE | MODE 4 STILL IMAGE | MODE 5 MOVING IMAGE |
|---|---|---|---|
| WIDE ANGLE IMAGING UNIT | MOVING IMAGE /STILL IMAGE CAPTURING | STILL IMAGE CAPTURING | MOVING IMAGE CAPTURING |
| NARROW ANGLE IMAGING UNIT | MOVING IMAGE /STILL IMAGE CAPTURING | STILL IMAGE CAPTURING | MOVING IMAGE CAPTURING |
| OPERATION | NARROW/WIDE ANGLE STILL IMAGE CAPTURING DURING WIDE/NARROW MOVING IMAGE CAPTURING | WIDE/NARROW ANGLE STILL IMAGE SIMULTANEOUS CAPTURING | WIDE/NARROW ANGLE MOVING IMAGE SIMULTANEOUS CAPTURING |

IMAGING APPARATUS AND SETTING SCREEN THEREOF

TECHNICAL FIELD

The present invention relates to a technique of controlling a plurality of imaging units in different operation modes and performing imaging in an imaging apparatus including a plurality of imaging units.

BACKGROUND ART

An imaging apparatus such as a digital camera that images a subject using an imaging element such as a CCD or a CMOS sensor generally includes a single imaging unit including a single imaging element and an optical system. An imaging apparatus including a plurality of imaging units has been proposed as well. As a background art of the present technical field, there is JP 10-134187 A (Patent Document 1). Patent Document 1 discloses an apparatus which includes a camera with a wide angle field of view and a camera with a narrow angle field of view and is capable of estimating depth information with a high degree of accuracy.

CITATION LIST

Patent Document

Patent Document 1: JP 10-134187 A

SUMMARY OF THE INVENTION

Problems to be Solved by the Invention

The apparatus disclosed in Patent Document 1 can estimate a wide angle field of view and an accurate depth. However, usability at the time of photographing or reproducing is not considered.

Solutions to Problems

In order to achieve the above object, as an example, according to the present invention, provided is an imaging apparatus including a first imaging unit, a second imaging unit, a display unit, an image signal processing circuit, a control circuit, a manipulation unit, a mode setting unit, and a recording unit, wherein the first imaging unit and the second imaging unit are arranged at a predetermined interval to perform imaging in the same direction, the image signal processing circuit generates a first image signal from a signal captured by the first imaging unit, generates a second image signal from a signal captured by the second imaging unit, and generates a third signal from the signal captured by the first imaging unit and the signal captured by the second imaging unit, the control circuit controls the first imaging unit, the second imaging unit, the image signal processing circuit, and the recording unit in response to a single imaging manipulation performed by the manipulation unit in accordance with a plurality of photographing modes which are settable in advance in accordance with an input from the mode setting unit, and the plurality of photographing modes include a photographing mode in which the first image signal is recorded, a mode in which the first image signal and the second image signal are recorded, and a mode in which the third signal is recorded.

Effects of the Invention

According to the present invention, is possible to provide an imaging apparatus with excellent usability capable of controlling a plurality of imaging units simultaneously so that imaging is performed with a simple manipulation.

BRIEF DESCRIPTION OF THE DRAWINGS

FIG. 1 is a block diagram illustrating a configuration of an imaging apparatus according to a first embodiment.

FIG. 2 is an external diagram illustrating an example of an imaging apparatus in the first embodiment.

FIG. 4 illustrates a list of photographing modes in the first embodiment.

FIG. 5 is an explanatory diagram illustrating a timing of an operation of normal photographing 2 in the first embodiment.

FIG. 6 is an explanatory diagram illustrating an imaging timing of an imaging unit in a high-speed continuous photographing mode according to the first embodiment.

FIG. 7 is a list of photographing modes in a second embodiment.

FIG. 14 illustrates a list of photographing modes in a third embodiment.

FIG. 15 illustrates an example of a menu screen when a first imaging unit and a second imaging unit are set individually in the third embodiment.

FIG. 16 illustrates an example of a screen display at the time of monitoring in the first to third embodiments.

FIG. 17 is an explanatory diagram of an imaging form in a fourth embodiment.

FIG. 21 is a block diagram illustrating a configuration of an imaging apparatus in a sixth embodiment.

FIG. 22 illustrates a list of normal photographing modes in the sixth embodiment.

FIG. 23 illustrates a list of simultaneous photographing modes in the sixth embodiment.

MODE FOR CARRYING OUT THE INVENTION

Figure 3:
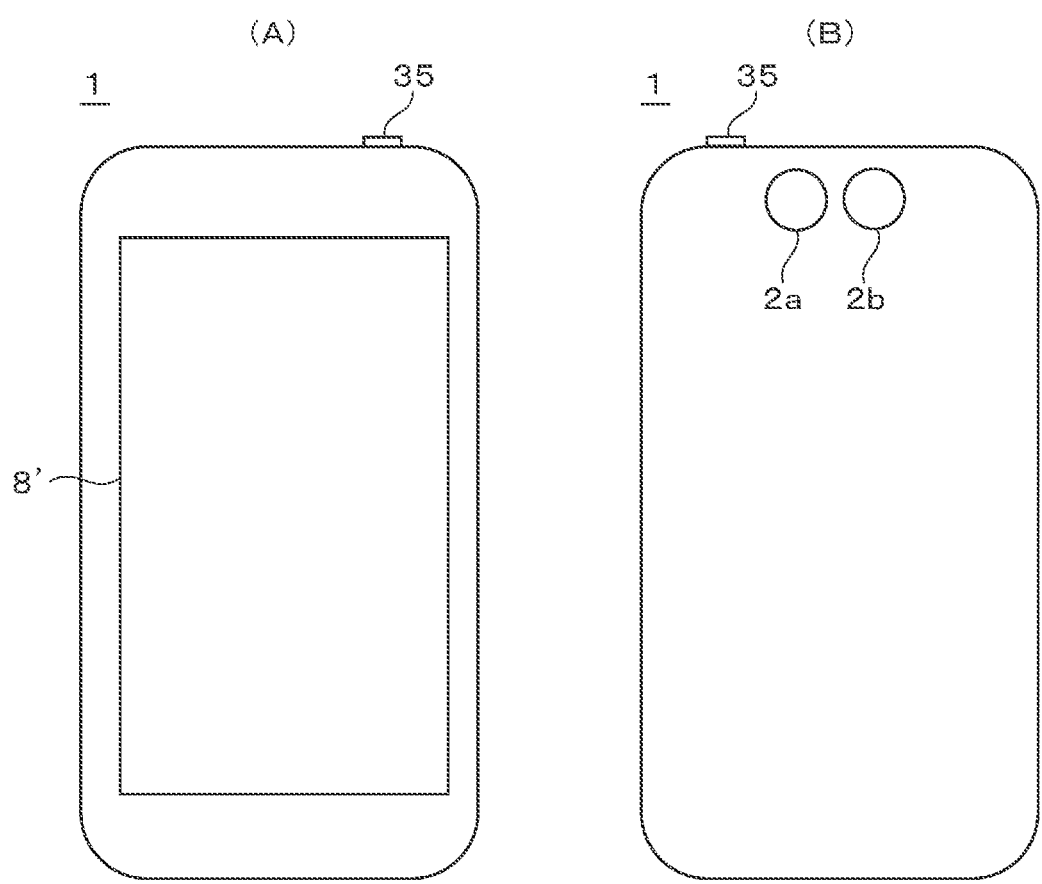
FIG. 3 is an external diagram illustrating another example of an imaging apparatus in the first embodiment.

Hereinafter, exemplary embodiments of the present invention will be described with reference to the appended drawings.

First Embodiment

FIG. 1 is a block diagram illustrating a configuration of an imaging apparatus according to the present embodiment. An imaging apparatus 1 of the present embodiment includes two imaging units. Reference numerals 2a and 2b indicate lens units, and reference numerals 3a and 3b indicate imaging units. The imaging units 3a and 3b are arranged to perform imaging in the same direction with a predetermined interval between. Each of the lens units 2a and 2b includes a plurality of lenses including a focus lens, and controls a position of the focus lens and performs a focusing operation through a control circuit 6.

Each of the imaging units 3a and 3b is constituted by an imaging element such as CMOS or CCD. Photoelectric conversion elements are two-dimensionally arranged on imaging planes of the imaging units 3a and 3b, and optical images of a subject which are input through the lens units 2a and 2b and formed on the imaging planes undergo photoelectric conversion and then converted into imaging signals. An AD conversion circuit for converting an analog signal into a digital signal is installed in each of the imaging units 3a and 3b, and a digital imaging signal is output from each of the imaging units 3a and 3b. Further, each of the imaging units 3a and 3b may increase an autofocus (AF) speed using an imaging element in which pixels for phase difference AF are arranged. A memory may be installed in each of the imaging units 3a and 3b so that an input/output speed of an imaged signal is increased. Further, in a case in which an imaging element including no AD conversion circuit therein is used, an AD conversion circuit may be installed outside the imaging units 3a and 3b. The imaging units 3a and 3b and the lens units 2a and 2b are controlled by the control circuit 6 in accordance with an operation mode.

An interface circuit 4 outputs the input signals from the imaging units 3a and 3b to an image signal processing circuit 5 in accordance with the operation mode of the imaging apparatus. At this time, either or both of the imaging signals captured by the imaging units 3a and 3b are outputted in accordance with the operation mode. This operation is controlled by the control circuit 6.

The image signal processing circuit 5 performs various kinds of signal processing such as filtering, amplification corresponding to a sensitivity setting, white balance correction, and the like on an output signal from the interface circuit 4. Further, the image signal processing circuit 5 generates moving image data or still image data which is a display video signal or a recording video signal in accordance with the operation mode. Each of the display video signal and the recording video signal includes a video signal corresponding to each of the imaging units 3a and 3b and a video signal generated by combining the output signals of the imaging units 3a and 3b.

The image signal processing circuit 5 is connected with the control circuit 6, a display 8, a memory 12 such as a DRAM or a flash memory, an encoding/decoding circuit 15, a recording/reproducing circuit 10, and the like and can perform a high speed cooperation process with each unit. For a hardware configuration, the image signal processing circuit 5 and the control circuit 6 may be constituted by an LSI in which both circuits are implemented by a single chip or individual LSIs. For the image signal processing circuit 5 and the recording/reproducing circuit 10, depending on performance requirements of the imaging apparatus, signal processing circuits and recording circuits of two systems corresponding to the two imaging units may be installed so that signal processing of two systems are performed at the same time.

The lens units 2a and 2b, the imaging units 3a and 3b, the interface circuit 4, the image signal processing circuit 5, a posture detecting unit 7, a manipulation input unit 9, a position information input unit 13, a wireless communication unit 14, and the like are connected to the control circuit 6. The control circuit 6 controls the units connected thereto in accordance with the operation mode. The control circuit 6 also controls the display 8, the encoding/decoding circuit 15, and the recording/reproducing circuit 10 via the image signal processing circuit 5 or directly. The posture detecting unit 7 includes a gyro sensor and an electronic compass and can detect a photographing direction (an azimuth angle and an elevation angle) of the imaging apparatus and an inclination of an image.

As described above, in the present embodiment, the encoding/decoding circuit 15 controls the imaging units 3a and 3b, the image signal processing circuit 5, the display 8, recording/reproducing circuit 10, and the like in accordance with the operation mode set in advance by a user manipulation by the control circuit 6, and performs control such that any one of the image signal captured in the imaging unit 3a, the image signal captured in the imaging unit 3b, and an image signal generated by combining the image signals captured in the imaging unit 3a and the imaging unit 3b is displayed or recorded.

The encoding/decoding circuit 15 performs an encoding process for recording on the video signal which has undergone the signal processing and performs a decoding process on reproduced image data. The recording/reproducing circuit 10 records the captured image data in a recording medium 11 and reproduces the image recorded in the recording medium 11.

The manipulation input unit 9 receives a manipulation input from the user. Specifically, as will be described later, a mode setting dial, a shutter button, a mode setting button, and the like correspond to the manipulation input unit 9. A manipulation which is frequently used by the user among settings for the imaging apparatus 1 may be assigned to the mode setting dial.

The display 8 is, for example, a display in which a touch panel and a display unit such as a liquid crystal panel are integrated and may further include an optical or electronic finder in addition to the display 8. Further, a type of the display unit is not limited to the liquid crystal, but any system such as an organic EL or the like may be used. For example, a capacitive type, a pressure sensitive type, or the like may be used as the touch panel.

FIG. 2 is an external diagram illustrating an example of the imaging apparatus in the present embodiment, and (A) is a rear view, (B) is a right side view, and (C) is a front view. In FIG. 2, the display 8 in which a touch panel is integrated is arranged on a back side of the imaging apparatus 1.

The lens units 2a and 2b are arranged at predetermined intervals to have substantially the same optical axis direction. The lens units 2a and 2b may be fixed type or a detachable type. As the manipulation input unit 9 of the imaging apparatus 1, a mode setting dial 31, a shutter button 32, a manipulation button 33, and a moving image capturing button 34 are installed. Reference numeral 35 indicates a power switch. The mode setting dial 31 is used for selecting a type of photographing mode of the imaging apparatus 1 or the like. The shutter button 32 is installed on an upper right part of a main body, and a photographing manipulation is performed when the shutter button 32 is pressed. The manipulation button 33 includes a center button and buttons corresponding to four directions, that is, up, down, left, and right directions and is used for displaying and selecting a menu screen. An electronic viewfinder may be installed on an upper surface side of the imaging apparatus 1.

The operation mode of the imaging apparatus 1 includes at least a photographing mode and a reproducing mode, and the photographing mode includes a plurality of modes. Preferably, switching between these operation modes is performed using the mode setting dial 31. A dedicated reproducing mode button may be installed for the reproducing mode. The type of photographing mode and the details thereof will be described later, and an overview of an operation of the photographing mode will be described here. If it is detected that a predetermined photographing mode is set by the manipulation input unit 9, the control circuit 6 performs control corresponding to the photographing mode on the imaging units 3a and 3b, the image signal processing circuit 5, the display 8, the encoding/decoding circuit 15, the recording/reproducing circuit 10, and the like. Still image capturing and moving image capturing can be performed in the photographing mode.

The control circuit 6 reads the imaging signal from the imaging unit 3a or 3b at a predetermined cycle, performs predetermined signal processing through the image signal processing circuit 5 via the interface circuit 4, converts a format of the image signal into a display format, and displays a moving image on the display 8 in real time. The user photographs in accordance with the following operation while monitoring the moving image.

In a case in which a still image is captured, the user presses the shutter button 32. The control circuit 6 detects that the shutter button 32 is pressed from the output of the manipulation input unit 9, and an aperture value, a shutter speed, and the like are set in accordance with a photographing condition set by the user. A shutter button having two states, that is, a half-pressed state and a full-pressed state may be used as the shutter button 32, and control may be performed such that settings of the focus, the shutter speeds, and the like are decided in the half-pressed state. The settings are executed by the control circuit 6 controlling the lens units 2a and 2b and the imaging units 3a and 3b. Whether imaging is performed by either of the imaging units 3a and 3b or bother of the imaging units 3a and 3b, signal processing to be performed, a signal to be recorded, and the like in accordance with the shutter button manipulation are controlled in accordance with the photographing mode which is set in advance. The image signals of the still images captured by the imaging units 3a and 3b undergo predetermined still image signal processing performed by the image signal processing circuit 5 and then undergo still image encoding performed by the encoding/decoding circuit 15. The memory 12 is used as a buffer memory used when the still image signal processing, the encoding process, or the like are performed. For example, a JPEG scheme is employed as an encoding scheme, but recording may be performed in an MPEG format or a high-quality RAW form as a scheme other than JPEG. The encoded still image data is recorded in the recording medium 11 by the recording/reproducing circuit 10 via the memory 12.

In a case in which a moving image is captured, if the moving image capturing button 34 is pressed, photographing is started, and if the moving image capturing button 34 is pressed again, the photographing is stopped. Preferably, the moving image is encoded in an MPEG format such as H264, H265, or any other moving image format. In the case of moving image capturing, moving image data is encoded into a predetermined format through the encoding/decoding circuit 15, and the encoded moving image data is recorded in the recording medium 11 through the recording/reproducing circuit 10 via the memory 12.

If it is detected that the reproducing mode is set in accordance with an input from the manipulation input unit 9, the control circuit 6 reads the still image or the moving image recorded in the recording medium 11 by the recording/reproducing circuit 10. Then, control is performed such that the still image or the moving image is decoded by the encoding/decoding circuit 15a and then displayed on the display 8.

As described above, the imaging apparatus according to the present embodiment includes a plurality of imaging units and can perform imaging by cooperation of a plurality of imaging units through a single photographing operation performed by the shutter button manipulation or the like in accordance with a preset operation mode.

FIG. 3 is an external diagram illustrating another example of the imaging apparatus 1 in the present embodiment, and (A) is a rear view, and (B) is a front view. In the example of FIG. 3, a shape is vertically longer than in the example of FIG. 2, and a display 8' relatively larger than that in the example of (A) of FIG. 2. Further, in the example of FIG. 3, the mode setting dial 31, the shutter button 32, the manipulation button 33, and the moving image capturing button 34 illustrated in FIG. 2 are not installed, but icons or the like corresponding to these manipulation buttons are displayed on the display 8' so that a desired input can be performed by a touch panel manipulation.

Next, the photographing mode in the present embodiment will be described. FIG. 4 is a list of photographing modes in the present embodiment. The photographing mode includes five modes, that is, normal photographing 1, normal photographing 2, simultaneous photographing, high-speed continuous photographing, and moving image/still image capturing. In FIG. 4, operation of the two imaging units, a record image, and an overview of control in each mode are described in each of these modes. A first imaging unit corresponds to the imaging unit 3a in FIG. 1, and a second imaging unit corresponds to the imaging unit 3b. Further, "enable" indicates that an imaging operation is performed, and "disable" indicates that the imaging operation is not performed. Further, for the record image, "first" or "second" indicates that an image captured in the first imaging unit or the second imaging unit is recorded, and "first and second" indicates that both of images captured by the first and second imaging units are recorded.

The normal photographing 1 is a photographing mode in which only the first imaging unit is enabled by an operation similar to that of a camera having a single imaging unit, monitoring and still image capturing are executed by the first imaging unit at the time of still image capturing, and monitoring and moving image capturing are executed by the first imaging unit at the time of moving image capturing. Since this mode is similar to that of a known arbitrary imaging apparatus including a single imaging unit, detailed description thereof is omitted. Here, the first imaging unit is "enabled," but the first imaging unit may be "disabled," and the second imaging unit to be "enabled." In this photographing mode, since only one imaging unit is operated, it is useful for reducing power consumption.

The normal photographing 2 is a mode in which both the first imaging unit and the second imaging unit are "enabled," but the first imaging unit is used for monitoring, and the second imaging unit is used for still image capturing. FIG. 5 is an explanatory diagram illustrating an operation timing of the normal photographing 2 in the present embodiment, and a horizontal axis indicates a time. In this mode, the first imaging unit reads frame images at a predetermined cycle in order to generate a moving image for monitoring. Exposure is performed at a frame cycle in parallel with reading. The read moving image is converted into a display image by the image signal processing circuit 5 of FIG. 1 and displayed on the display 8. The user monitors the moving image and presses the shutter button at a desired timing (shutter-on in FIG. 5). The second imaging unit starts exposure after the shutter-on is detected by the control circuit 6, and reads the captured still image signal when the exposure of an exposure time corresponding to a set shutter speed ends. A time required for reading is decided depending on the number of pixels of the still image and a reading speed, but it generally takes longer time than a frame of the moving frame for monitoring in the first imaging unit.

In an imaging apparatus including a single imaging unit, since still image capturing and monitoring before imaging are executed by a single imaging unit, the monitoring is interrupted during the still image capturing, and a shutter change of next photographing is likely to be missed. According to the operation of the present embodiment, it is possible to continuously monitor even during still image capturing, and the shutter change is unlikely to be missed.

Next, the simultaneous photographing mode will be described. In the simultaneous photographing mode, the first and second imaging units perform imaging at the same time. In this mode, the first imaging unit performs monitoring and still image capturing, and the second imaging unit performs still image capturing at the same timing as the imaging of the first imaging unit. In this mode, it is possible to change the photographing conditions (for example, a shutter speed, a diaphragm, an ISO sensitivity, an effect, and the like) of the first and second imaging units and perform imaging at the same time.

Next, the high-speed continuous photographing mode will be described. FIG. 6 is an explanatory diagram illustrating imaging timings of the first imaging unit and the second imaging unit in the high-speed continuous photographing mode in the present embodiment. In this mode, the images are alternately captured by the first imaging unit and the second imaging unit. If one cycle of imaging when the still image capturing is performed at the highest speed in a single imaging unit is indicated by T, the number of still images which can be captured per second is 1/T. In this case, it is assumed that a time required for signal processing or recording has a sufficient processing capability for an imaging cycle. In the high-speed continuous photographing mode, it is possible to perform high-speed continuous photographing at a speed which is as twice as a speed when there is a single imaging unit by shifting the imaging timings of the first imaging unit and the second imaging unit by T/2.

Next, the moving image still image capturing mode will be described. In this mode, moving image capturing is performed in the first imaging unit, and still image capturing is performed in the second imaging unit. Since different imaging units are used for moving image capturing and still image capturing, the still image can be captured at arbitrary timing during the moving image capturing. At this time, unlike a case in which imaging is performed by a single imaging unit, it is unlikely that a part of the moving image is lost at a timing at which a still image is captured, or a size of a still image recorded during the moving image capturing is restricted. In the present mode, the still image capturing is executed at a timing at which the shutter button 32 is pressed, and the moving image capturing is started or ended when the shutter button 32 is pressed.

In the present embodiment, with the manipulation of the shutter button 32, it is possible to provide an imaging apparatus with excellent usability capable of performing imaging through a plurality of imaging units by a simple manipulation similar to a manipulation of an imaging apparatus including a single imaging unit. Further, there is a merit in that monitoring is not interrupted during the still image capturing, the shutter chance is less missed, and high-speed imaging is possible.

In the present embodiment, the five modes, that is, the normal photographing 1, the normal photographing 2, the simultaneous photographing, the high-speed continuous photographing, and the moving image/still image capturing have been described as specific examples of the photographing mode, but all the five modes may be provided or some of the five modes may be provided.

As described above, in the present embodiment, an imaging apparatus including a plurality of imaging units includes a setting unit that sets a plurality of photographing modes which are settable in advance, a unit that controls a plurality of imaging units in accordance with a set photographing mode, and a manipulation unit. Accordingly, it is possible to perform imaging through cooperation of a plurality of imaging units in response to a single photographing instruction given by the manipulation unit.

In other words, an imaging apparatus includes a first imaging unit, a second imaging unit, a display unit, an image signal processing circuit, a control circuit, a manipulation unit, a mode setting unit, and a recording unit, wherein the first imaging unit and the second imaging unit are arranged at a predetermined interval to perform imaging in the same direction, the image signal processing circuit generates a first image signal from a signal captured by the first imaging unit, generates a second image signal from a signal captured by the second imaging unit, and generates a third signal from the signal captured by the first imaging unit and the signal captured by the second imaging unit, the control circuit controls the first imaging unit, the second imaging unit, the image signal processing circuit, and the recording unit in response to a single imaging manipulation performed by the manipulation unit in accordance with a plurality of photographing modes which are settable in advance in accordance with an input from the mode setting unit, and the plurality of photographing modes include a photographing mode in which the first image signal is recorded, a mode in which the first image signal and the second image signal are recorded, and a mode in which the third signal is recorded.

Accordingly, it is possible to provide an imaging apparatus with excellent usability capable of controlling a plurality of imaging units simultaneously so that imaging is performed with a simple manipulation.

Second Embodiment

Another embodiment of the present invention will be described. A configuration of an imaging apparatus in the present embodiment is similar to that of the first embodiment illustrated in FIG. 1. Content of a photographing mode which is a difference from the first embodiment will be described with reference to FIG. 7. FIG. 7 is a list of photographing modes in the present embodiment. The photographing mode in the present embodiment includes five modes, that is, distance measurement, background gradation, distance adaptation, high dynamic range (HDR), and 3D.

In the distance measurement mode, the still image capturing or the moving image capturing is performed by the first imaging unit, and distance information of each part in the image captured using the first imaging unit or the second imaging unit is calculated. The calculated distance information is recorded together with image information captured by the first imaging unit. The distance information is calculated as distance information for each pixel or each region including a plurality of adjacent pixels by a known technique such as stereo matching using parallax information of the first imaging unit and the second imaging unit. The distance information calculated in this manner is recorded in an image file together with the captured image data or recorded as a separate file. Although a file format of a file of three-dimensional information to be recorded as a separate file is arbitrary, and it may be converted into polygon data such as an STL format used for 3D printing or the like and recorded.

In the distance measurement mode, it is possible to detect the distance information at an arbitrary position on the image at the time of photographing or reproducing. For example, an interface that displays a distance to the designated point such as a distance from a photographing position to a subject on the display when the user designates an arbitrary point on a screen on a touch panel may be provided.

In the distance measurement mode, an image to be recorded is an image captured by the first imaging unit, but instead of the image captured by the first imaging unit, only an image captured by the second imaging unit may be recorded, or two images captured by the first and second imaging units may be recorded.

In the distance measurement mode, the image captured by the first imaging unit or the second imaging unit is recorded, and the distance information corresponding to each pixel or pixel region is calculated from the two images captured by the first imaging unit and the second imaging unit and recorded. It is possible to the distance information to an arbitrary point of the captured image as described above. As a method of measuring a distance, a light emitting unit and a light receiving unit for laser light may be installed, and active type distance measurement of measuring a distance using a time difference between light emission and light reception may be used together, and in this case, particularly, distance measurement accuracy for a long distance is improved.

Next, the background gradation mode will be described. In this mode, the distance information is calculated using the images captured by the first imaging unit and the second imaging unit, similarly to the distance measurement mode described above. A process of gradating the background using the distance information is performed. This process will be described in detail.

Figure 8:
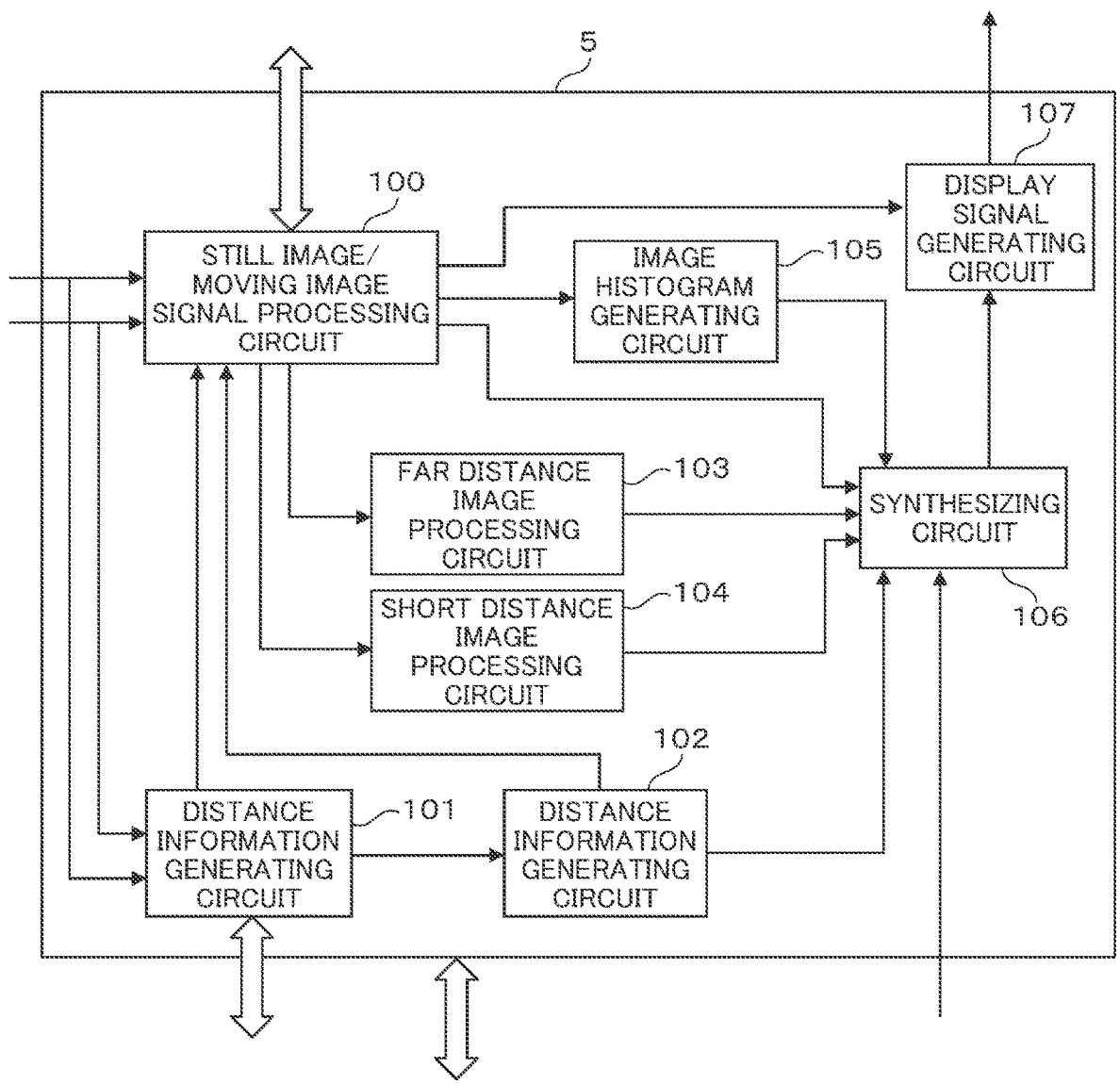
FIG. 8 is a block diagram illustrating an example of a configuration of an image signal processing circuit in the second embodiment.

FIG. 8 is a block diagram illustrating an example of a configuration of the image signal processing circuit 5 in FIG. 1. In FIG. 8, reference numeral 100 indicates a still image/moving image signal processing circuit, reference numeral 101 indicates a distance information generating circuit, reference numeral 102 indicates a distance histogram generating circuit, reference numeral 103 indicates a far distance image processing circuit, reference numeral 104 indicates a short distance image processing circuit, reference numeral 105 indicates an image histogram generating circuit, reference numeral 106 indicates a synthesizing circuit, and reference numeral 107 indicates a display signal generating circuit. The still image/moving image signal processing circuit 100 generates still image data and moving image data for recording from still image data and moving image data output from the first or second imaging unit. The still image/moving image signal processing circuit 100 executes signal processing while appropriately buffering the image data in the memory 12 (FIG. 1) in accordance with the control of the control circuit 6 (FIG. 1). The still image/moving image signal processing circuit 100 may include a signal processing unit that performs subject recognition or the like therein and recognize various subjects or perform a person recognition process.

The distance information generating circuit 101 generates the distance information for each pixel or each pixel group including a plurality of adjacent pixels the captured image of the first imaging unit and the captured image of the second imaging unit. The images captured at the same timing in the first imaging unit and the second imaging unit may be used when the distance information is generated. In the following description, a frame image generated at a predetermined timing in the first imaging unit is referred to as a first image, and an image generated at the same timing as the first image in the second imaging unit is referred to as a second image. It is desirable to generate the distance information from the first image and the second image using a known method. As an example, it is desirable to generate the distance information from the first image and the second image using a principle of triangulation. An input unit that receives the first image data input from the first imaging unit and the second image data input from the second imaging unit as an input signal to the distance information generating circuit 101 is provided. Further, the distance information generating circuit 101 includes an input/output interface capable of reading/writing the input first and second image data from/to the memory 12 (FIG. 1). Accordingly, it is possible to perform various kinds of processes on arbitrary pixels of the first image and the second image. Here, pixels of the second image corresponding to the respective pixels of the first image are obtained by a pattern matching process. It is assumed that the first imaging unit and the second imaging unit are arranged in parallel to an optical axis direction at an interval of a certain distance B, and an arbitrary pixel p1 in the first image has a parallax δ when a pixel of the second image corresponding to the arbitrary pixel p1 of the first image obtained by pattern matching is indicated by p2. The distance information generating circuit 101 generates δ for each pixel. At this time, a distance Z between the imaging unit and the subject can be calculated from a relation of Z=B×f÷δ in accordance with the principle of triangulation. Here, f indicates a focal distance of the imaging unit, and the focal distances of the first imaging unit and the second imaging unit are assumed to be equal. The distance information of an arbitrary pixel of the first image can be obtained by calculating a distance image for each pixel as described above.

Figure 9:
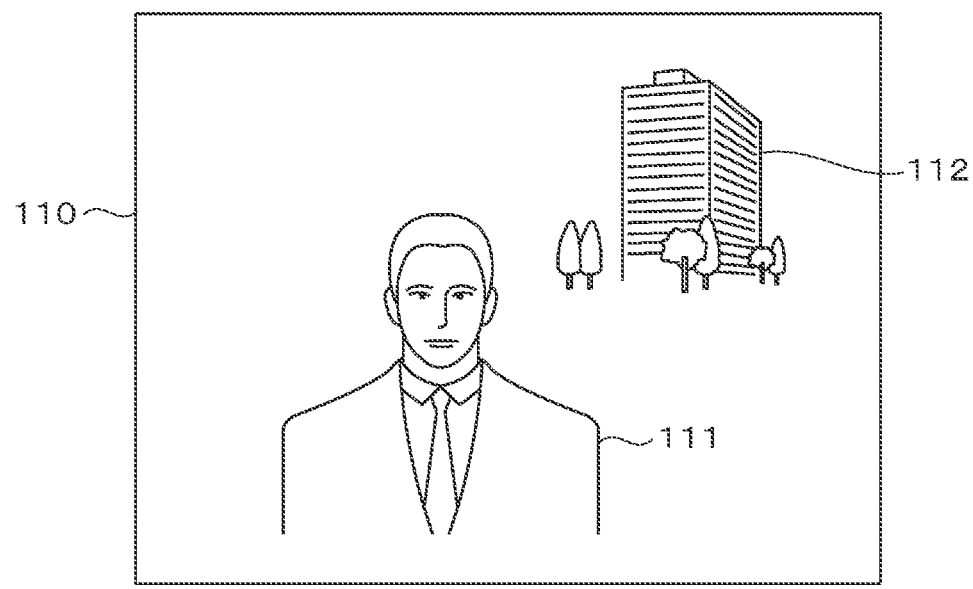
FIG. 9 illustrates an image example in the second embodiment.
Figure 10:
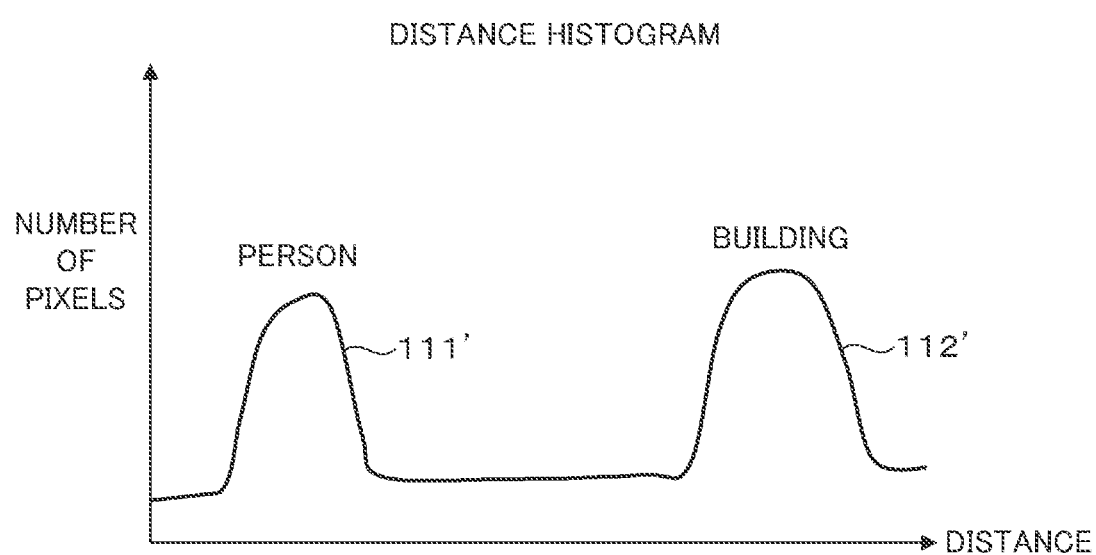
FIG. 10 is a diagram illustrating a distance histogram for an image of FIG. 9.

The distance histogram generating circuit 102 calculates a distance histogram, that is, information of the number of pixels of a distance with respect to the distance, in other words, a frequency of pixels with respect to the distance. FIG. 9 illustrates an image example, and FIG. 10 illustrates a distance histogram for the image. The image includes a person 111 serving as a subject and a building 112 which is a distant view. In the distance histogram of FIG. 10, 111' is a part corresponding to the person and is at a short distance. Reference numeral 112' is a part corresponding to the building and is at a far distance.

The still image/moving image signal processing circuit 100 includes a separating unit for separating the image data into a plurality of signal groups belonging to a predetermined subject distance, and performs different signal processing in accordance with a distance through the far distance image processing circuit 103 and the short distance image processing circuit 104 at a subsequent stage.

The far distance image processing circuit 103 performs signal processing on a part located at a long distance. In the present background gradation mode, the far distance image processing circuit 103 performs a strong low pass filter process on the far distance image corresponding to the background. The image histogram generating circuit 105 calculates, for example, the number of pixels or the frequency of pixels in an image having luminance for the luminance. A histogram for an RGB signal may be calculated and displayed on the display.

The short distance image processing circuit 104 performs signal processing on a part of an image located at a short distance. In the present background gradation mode, this short distance image processing circuit 104 performs arbitrary signal processing suitable for a subject on a short distance image such as a person corresponding to a subject through the short distance image processing circuit 104. For example, in the distance histogram of FIG. 10, the far distance image processing circuit 103 performs the strong low pass filter process on the far distance image corresponding to the background as described above.

Figure 11:
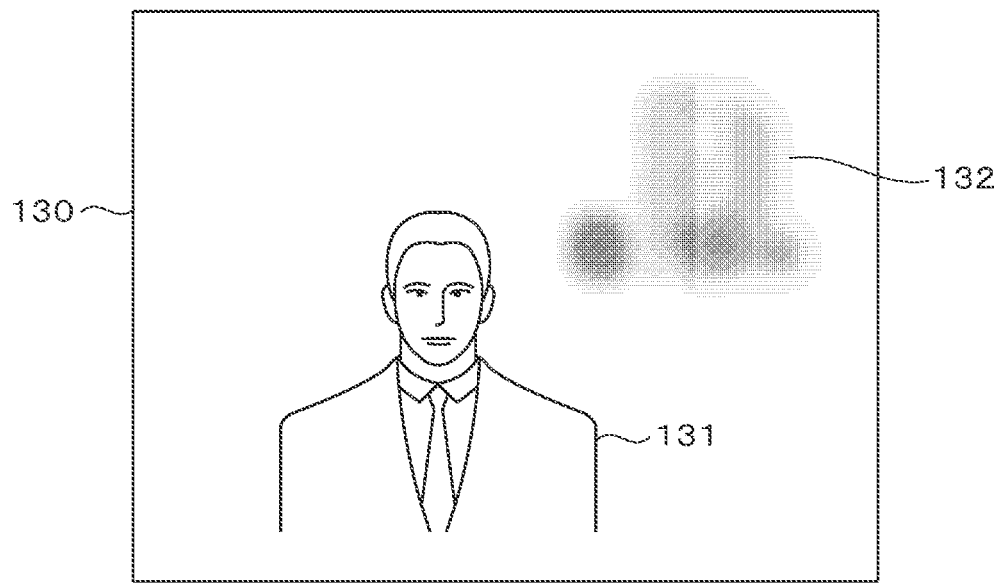
FIG. 11 illustrates a combined output image example in the second embodiment.

The images which have undergone different signal processing according to the distance performed by the short distance image processing circuit 104 and the far distance image processing circuit 103 are combined by the synthesizing circuit 106, and a display image displayed on the display 8 (FIG. 1) is generated by the display signal generating circuit 107. FIG. 11 illustrates an example of a combined output image. Reference numeral 130 indicated a combined image displayed on the display, and reference numeral 131 indicated a part corresponding to a person. Reference numeral 132 indicated a part corresponding to the background such as the building, and the part is gradated by a filter process to correspond to the background.

Outputs of the distance histogram generating circuit 102 and the image histogram generating circuit 105 are also connected to the synthesizing circuit 106, and in addition to the display of the image, the distance histogram or the image histogram can be displayed on the display independently or superimposed on the image. Such a display can be realized by a configuration in which a menu in which the user can selectively switch display content displayed on the display can be displayed and selected by the user. Further, the image histogram and the distance histogram may be displayed separately, or the image histogram and the distance histogram may be integrated by, for example, a method in which a horizontal axis indicates a distance, and a vertical axis indicates a luminance, and a two-dimensional histogram of the distance and the luminance may be displayed.

A strength or a type of signal processing such as a strength of a low pass filter in the far distance image processing circuit 103 and the short distance image processing circuit 104 and a distance on the histogram in which the signal processing is switched may be adaptively changed in accordance with a shape of the histogram calculated by the distance histogram generating circuit 102. Further, when a person subject is detected in combination with the person recognition process in still image/moving image signal processing, a process when the person subject is detected may be different from a process when the person is not detected.

In FIG. 8, the far distance image processing circuit 103 and the short distance image processing circuit 104 are configured so that different signal processing can be performed on two steps of distances, but the distance may be divided into three steps, and different processes of other steps may be performed in accordance with the distance.

By using the background gradation mode, it is possible to perform imaging after emphasizing a near view such as a person subject while giving gradation to the background, and it is possible to generate an image in which the background is gradated as if it were captured by a single-lens reflex camera even when a small-sized imaging element is used.

Next, the distance adaptive processing mode will be described. The background gradation mode described above is a mode in which the near view such as the person subject is emphasized, and the background is gradated, whereas the distance adaptive processing mode is a mode in which the background gradation is further generalized. Depending on a preference of the user, a process similar to background gradation can be included, different processes can be performed in accordance with the distance of the subject, and the process of gradating the near view or the like can be performed as well. For this reason, an interface that enables the user to change processing content is provided.

Figure 12:
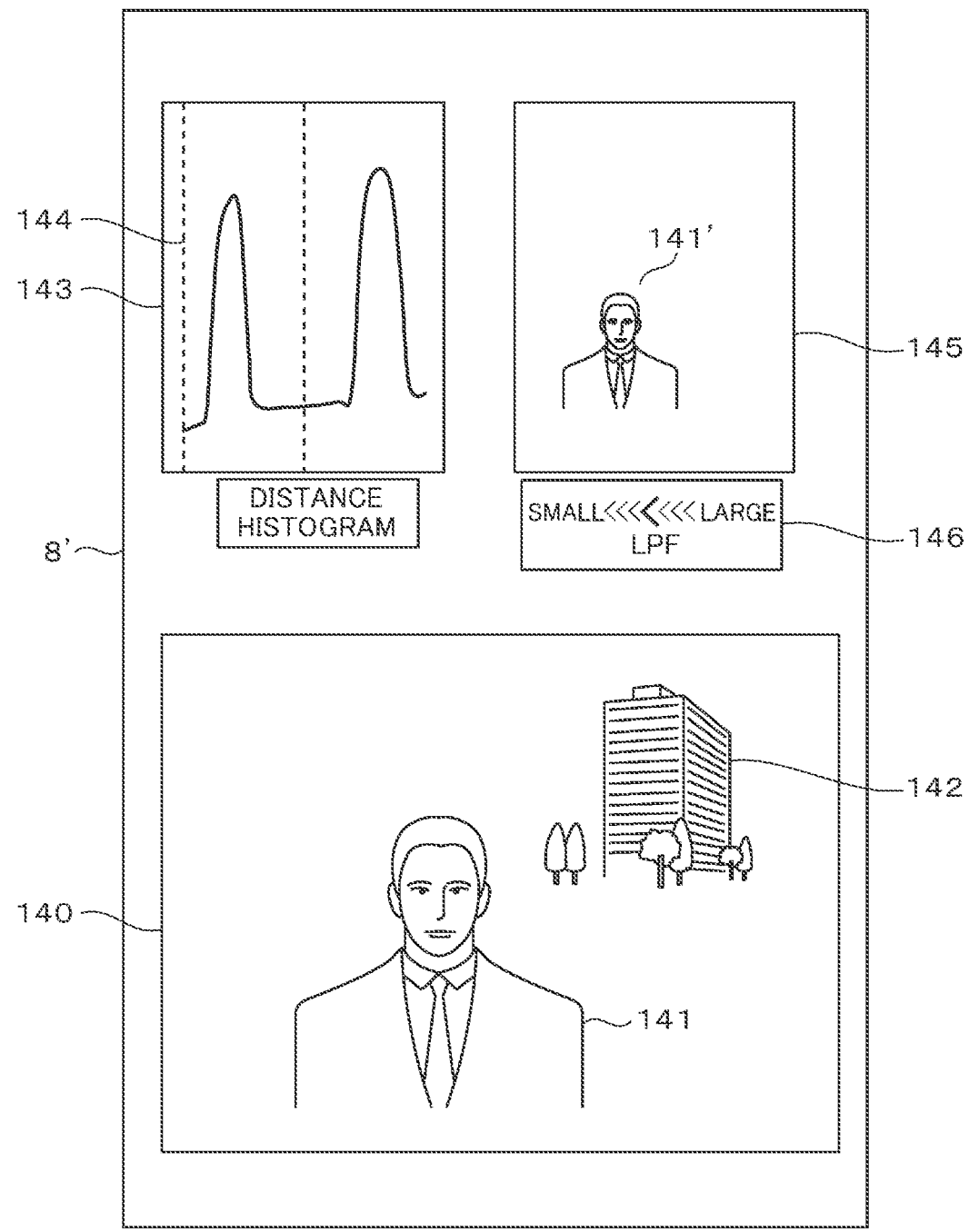
FIG. 12 illustrates a screen display example of a user interface in a distance adaptive processing mode in the second embodiment.

FIG. 12 illustrates a screen display example of a user interface in the distance adaptive processing mode. For example, it is assumed that the user sets a menu for causing a screen of FIG. 12 to be displayed from a menu screen and causes the screen to be displayed. In FIG. 12, reference numeral 8' indicates a display screen of a display, and the display screen includes three regions, that is, a video display region 140, a distance histogram display region 143, and an image display region 145 of a specific distance. The input image is the same image as the image of FIG. 9 described above. The image displayed on the video display region 140 is an image which has undergone signal processing. In the distance histogram display region 143, similarly to the example illustrated in FIG. 10, the distance histogram is displayed, and at the same time, a selection frame 144 is displayed. The selection frame 144 enables the user to change a position by a touch panel manipulation of the user. Here, the image corresponding to the position on the selected distance histogram region is displayed on the distance histogram display region 143. Since a short distance part corresponding to a person in the distance histogram display region 143 is selected through the selection frame 144, an input image 141' of a person part is displayed on the image display region 145 of the specific distance. Reference numeral 146 indicates an image quality adjustment display, and here, as an example of an image quality adjustment item, a menu for adjusting a strength of the low pass filter for gradation is displayed. The user can adjust the strength of the low pass filter by the touch panel manipulation and can check an image quality adjustment effect through the video display region 140. A menu of arbitrary image processing such as color correction other than the low pass filter may be displayed.

Figure 13:
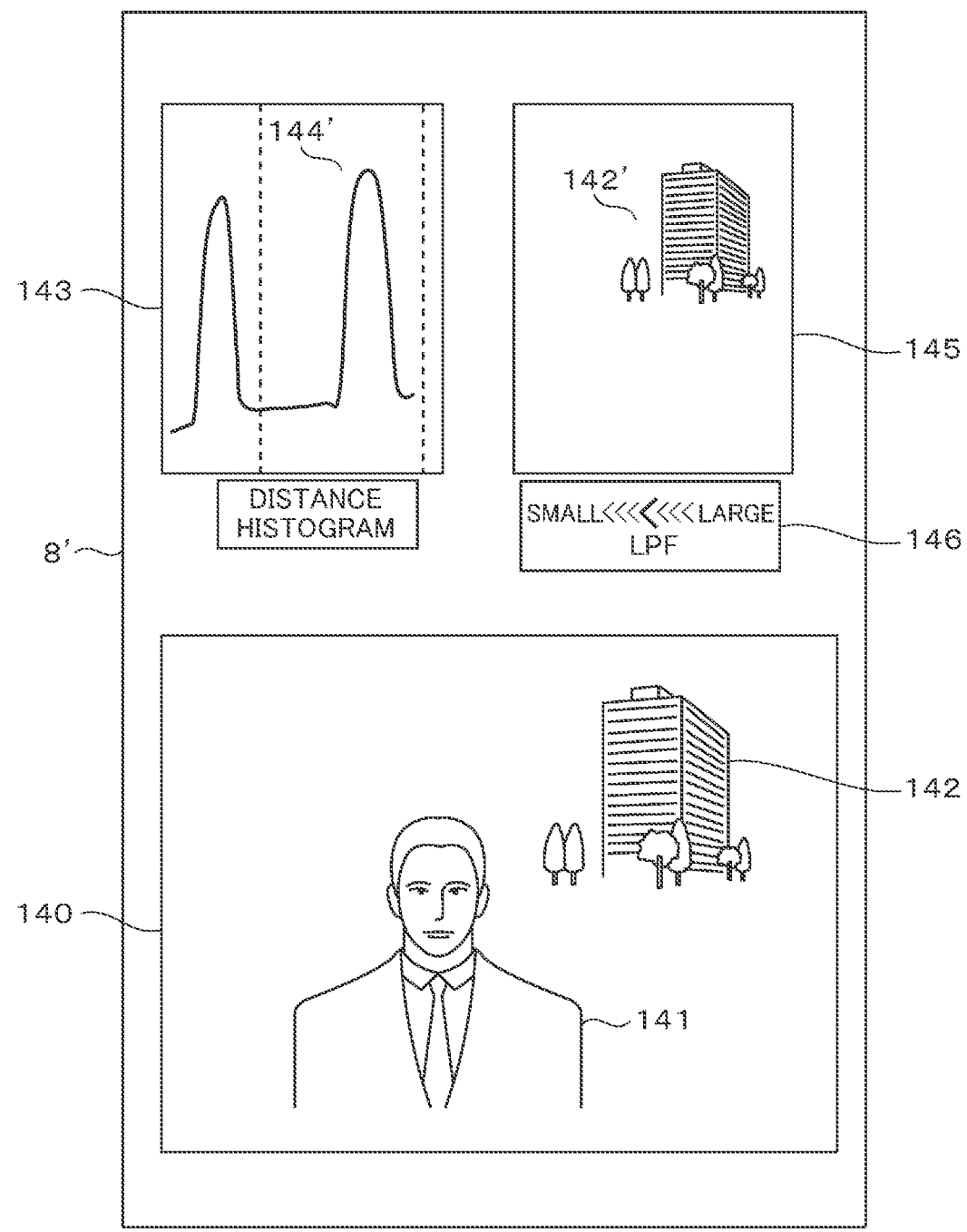
FIG. 13 illustrates another screen display example of a user interface in a distance adaptive processing mode in the second embodiment.

FIG. 12 illustrates the screen display example in a case in which the person part is elected in the distance histogram display region 143, whereas FIG. 13 illustrates a screen display example in a case in which a background region including a building is selected through the selection frame 144. Therefore, an input image 142' of the background part including the building is displayed in the image display region 145 of the specific distance.

In the distance adaptive processing mode, it is possible to execute the process corresponding to the preference of the user for each arbitrary region which can be separated in accordance with the subject distance on the image, and it is possible to correct the color of the subject or gradate the rear new in addition to the background gradation. Even in this mode, similarly to the background gradation, the process may be executed at other steps other than two steps in accordance with the distance. Further, in the user interface, a pre-process image and a post-process image may be displayed side by side so that the image processing effects can be more easily compared. Further, the distance may be selected without displaying the distance histogram.

In FIG. 7, the HDR is a mode in which images captured in the first imaging unit and the second imaging unit under different imaging conditions are combined, and an image with less under or over exposure is generated. Here, the imaging condition does not mean the photographing environment but means the setting conditions of the imaging apparatus related to photographing such as the shutter speed, the diaphragm, the ISO sensitivity, and the like.

If the exposure time is increased, an image with a good S/N ratio is generally obtained, but it tends to be saturated, and reproducibility of a high luminance part tends to get worse. If the exposure time is decreased, an image with high reproducibility of a high luminance part is generally obtained, but an S/N of a low luminance part tends to get worse. In this regard, in the HDR mode, images with different exposure times are captured in the first imaging unit and the second imaging unit. For example, an image with a large dynamic range and an image with a small dynamic range but a good S/N are captured by the first imaging unit and the second imaging unit and combined by setting a high speed shutter in the first imaging unit and setting a low speed shutter in the second imaging unit, increasing the ISO sensitivity of the first imaging unit and decreasing the ISO sensitivity of the second imaging unit, or changing a combination thereof. When combined, an image in which a balance of the luminance, color reproducibility, and the S/N is good in both the low luminance part and the high luminance part, and a dynamic range is effectively wide is generated in accordance with the image histogram.

In an imaging apparatus including only a single imaging unit, it is also possible to continuously capture and combine images in which the exposure time is changed, but if the subject moves, a change occurs in continuous images with different exposure times, and a double image is formed, and thus a dynamic range increase effect is unlikely to be obtained. On the other hand, in the present embodiment, since the first imaging unit and the second imaging unit can perform imaging simultaneously, there is an effect in that the dynamic range can be increased, and at this time, the double image is less likely to occur.

Although the present embodiment has been described above with reference to FIG. 7, the imaging apparatus may have all the modes or some of the modes. Further, modes obtained by combing the modes may be used. For example, the background gradation and the HDR may be combined. Since the high-speed shutter image and the low-speed shutter image are captured by the first imaging unit and the second imaging unit and combined, it is possible to perform the background gradation using the distance information obtained from the first imaging unit and the second imaging unit while performing a known dynamic range increase process. Further, the modes of FIG. 4 described in the first embodiment may be appropriately combined.

Next, the 3D mode is a mode in which a right-eye image and a left-eye image are recorded by the first imaging unit and the second imaging unit. When the image captured in this 3D mode is captured or reproduced, the right-eye image of the first imaging unit and the left-eye image of the second imaging unit may be displayed side by side on the display 8, and a dedicated view of preventing interference between the left and right images so that the left-eye image can be viewed only by the left eye, and the right-eye image can be viewed only by the right eye may be installed on a displayed so that a 3D image can be viewed.

As described above, according to the present embodiment, it is possible to provide an imaging apparatus with excellent usability which is capable of performing imaging through cooperation of a plurality of imaging units in response to a single photographing instruction given by the manipulation unit and controlling a plurality of imaging units simultaneously with a simple manipulation so that imaging is performed in a plurality of photographing modes, similarly to the first embodiment.

Third Embodiment

Another embodiment of the present invention will be described. A configuration of an imaging apparatus in the present embodiment is similar to that in the first embodiment illustrated in FIG. 1. Content of a photographing mode which is a difference from the first and second embodiments will be described with reference to FIG. 14. The photographing mode in the present embodiment includes five modes, that is, program AE, diaphragm priority, shutter priority, dual, and manual.

The program AE mode is a photographing mode in which the first imaging unit and the second imaging unit capture images in accordance with two different program line diagrams. At this time, the program line diagram is arbitrary.

The user may be able to select two line diagrams among a plurality of program line diagrams. Further, in this mode, a focus mode and a timer setting may be able to be individually set in the first imaging unit and the second imaging unit, for example, manual focus may be set in the first imaging unit, and autofocus may be set in the second imaging unit, or a timer setting may be performed in the second imaging unit without performing a timer setting in the first imaging unit so that imaging can be performed by the second imaging unit after a predetermined period of time according to the timer setting after imaging is performed by turning on the shutter button of the first imaging unit.

The diaphragm priority mode is a photographing mode in which the first imaging unit and the second imaging unit perform imaging in accordance with two different diaphragm priority AEs. It is possible to perform simultaneous photographing with two different aperture values.

The shutter priority mode is a photographing mode in which the first imaging unit and the second imaging unit perform imaging in accordance with two different shutter priority AEs. It is possible to perform simultaneous photographing at two different shutter speeds.

The dual mode is a photographing mode in which the first imaging unit and the second imaging unit perform imaging in accordance with two different operation modes among the program AE, the diaphragm priority, the shutter priority, and the manual. For example, the diaphragm priority is set in the first imaging unit, and the shutter priority is set in the second imaging unit so that simultaneous photographing is performed, and it is possible to perform simultaneous photographing by combining two modes which are arbitrarily selected among the program AE, the diaphragm priority, the shutter priority, and the manual.

The manual mode is a mode in which the photographing condition is set by two kinds of different manual settings in the first imaging unit and the second imaging unit so that simultaneous photographing is performed. The photographing condition which can be set is arbitrary, and a focus, a timer, an image quality, a special effect, or the like can be set in addition to the ISO sensitivity, the aperture value, and the shutter speed.

According to the present embodiment, it is possible to perform photographing in two photographing modes with different photographing conditions, and it is possible to increase the frequency at which a desired photograph can be taken.

FIG. 15 illustrates an example of a menu screen when settings of the first imaging unit and the second imaging unit are individually performed in the present embodiment. Reference numerals 800 to 804 indicate setting items of the first imaging unit and indicate respective setting menus of the ISO sensitivity, the aperture value, the shutter speed, the timer, and the strobe in order. For example, it is desirable that it be possible to select a desired item a touch panel manipulation and change a setting of each item. Similarly, 805 to 809 indicate setting items of the second imaging unit, and different settings can be performed between the first imaging unit and the second imaging unit. In the manual mode, all the setting items can be set, but possible items are automatically set in accordance with the mode. For example, in the diaphragm priority mode, it is possible to set the aperture value, but since the shutter speed is set automatically, a manual setting is not received.

Although the present embodiment has been described above with reference to FIG. 14, the imaging apparatus may have all the modes or some of the modes. Further, the modes of FIG. 4 or FIG. 7 described in the first embodiment or the second embodiment may be appropriately combined.

An example of a screen display at the time of monitoring when the still image or the moving image is captured in the first to third embodiments described above will be described with reference to FIG. 16. (A) of FIG. 16 illustrates a screen display in which an image of either of the first imaging unit and the second imaging unit is displayed. In (A) of FIG. 16, reference numeral 8 indicates a display, and reference numeral 92 indicates a mode display button, and mode names which are currently set are displayed in an OSD manner. Reference numeral 93 indicates a camera setting button, and if the button is selected, the menu screen of FIG. 8 is displayed. The selection manipulation is performed, for example, by a touch panel installed in the display 8. Reference numeral 94 indicates a screen switching button used for performing switching between the first imaging unit and the second imaging unit in a 1-screen display and switching between the 1-screen display and a 2-screen display. The switching between the first imaging unit and the second imaging unit in the 1-screen display and the switching between the 1-screen display and the 2-screen display may be sequentially performed when the same button is pressed, or the switching between the first imaging unit and the second imaging unit in the 1-screen display and the switching between the 1-screen display and the 2-screen display may be performed by different manipulation buttons.

(B) of FIG. 16 illustrates the 2-screen display in which images of the first imaging unit and the second imaging unit are simultaneously displayed on two screens. Depending on the imaging mode, only the 1-screen display may be performed, or selection of the 1-screen display or the 2-screen display may be performed. For example, in the normal photographing 1 of FIG. 4, since only the first imaging unit is enabled, even only the 1-screen display is sufficient. At this time, the screen switching button is not displayed. On the other hand, since the respective modes in FIG. 14 use both the first and second imaging units, the screen switching button is displayed. As described above, since switching between the 1-screen display and the 2-screen display is selectively performed depending on the photographing mode, and the usability is improved.

As described above, according to the present embodiment, it is possible to provide an imaging apparatus with excellent usability which is capable of performing imaging through cooperation of a plurality of imaging units in response to a single photographing instruction given by the manipulation unit and controlling a plurality of imaging units simultaneously with a simple manipulation so that imaging is performed in a plurality of photographing modes, similarly to the first and second embodiments.

Fourth Embodiment

In the present embodiment, an example using the first imaging unit and the second imaging unit having different hardware configurations will be described. In other words, in the first to third embodiments, the first imaging unit and the second imaging unit basically have the similar hardware configuration, whereas in the present embodiment, the first imaging unit and the second imaging unit employ different hardware configurations.

FIG. 17 is an explanatory diagram of an imaging form in the present embodiment. FIG. 17 illustrates operations of the two imaging units, a record image, and an overview of control in each mode, similarly to FIGS. 4, 7, and 14. A photographing form illustrated in FIG. 17 includes five photographing forms, that is, imaging/recognition, visible/near infrared, tele/wide, panorama, and OLPF which will be described below.

First, in the imaging/recognition photographing form, normal imaging is performed in the first imaging unit, and an image recognition process is performed in the second imaging unit. The second imaging unit may perform detection such as AE, AF, AWB, or the like. The second imaging unit may be used as a dedicated sensor for phase difference AF. In the present photographing form, effects similar to those of the normal imaging mode of the first embodiment are obtained.

Next, in the visible/near infrared photographing form, visible light imaging is performed in the first imaging unit, and near infrared light or infrared light imaging is performed in the second imaging unit. The image signal processing circuit 5 combines imaging signals of the first imaging unit and the second imaging unit. Since the visible light imaging is performed in the first imaging unit, an image with good color reproducibility is obtained, and since imaging of infrared light from near infrared light or near infrared light is performed in the second imaging unit, a high sensitivity video is obtained. In the present photographing form, there is an effect in that that both the color reproducibility and the high sensitivity can be implemented.

Next, in the tele/wide photographing form, the first imaging unit and the second imaging unit perform imaging using lenses with different focal distances. Alternatively, the first imaging unit and the second imaging unit capture images having equivalently different focal distances by a combination of an electronic zoom and a lens. At the time of recording, each of the images captured by the first imaging unit and the second imaging unit is recorded. The images captured at the same timing in the first imaging unit and the second imaging unit may be recorded in association with each other. In the present photographing form, since two images having equivalently different focal distances can be captured at the same time by using different lenses with different focal distances or by a combination of an electronic zoom and a lens, it is an effect in that it is possible to capture a wide angle image and a narrow angle image or an image of the entire photographing scene and an image of a specific part at the same time.

Next, in the panorama photographing form, imaging of a wider angle than when imaging is performed using a single imaging unit is performed using the first imaging unit and the second imaging unit, and it is here referred to as "panorama." The first imaging unit and the second imaging unit are arranged such that imaging ranges of the first imaging unit and the second imaging unit come into contact each other or the imaging ranges overlap partially. For example, the imaging units are horizontally installed so that the first imaging unit images a range of left 90°, the second imaging unit images a range of right 90°, and the imaging ranges come into contact each other. The captured images of the first imaging unit and the second imaging unit are combined by the image signal processing circuit, so that imaging of a wide angle of 180° can be performed. In the present photographing form, there is an effect. There is an effect in that it is possible to generate a panorama image of a wide angle through single imaging.

Finally, in the OLPF photographing form, an imaging unit including an optical low pass filter is used as the first imaging unit, an imaging unit including no optical low pass filter is used as the second imaging unit, and simultaneous imaging is performed in the first imaging unit and the second imaging unit. Images captured by the first imaging unit and the second imaging unit are recorded separately. If imaging is performed using the optical low pass filter, it is possible to eliminate folding noise occurring when an optical image is sampled by pixels at the time of imaging. Accordingly, it is possible to reduce so-called moiré occurring when a subject having a fine pattern is photographed. However, when the optical low pass filter is used, there is a problem in that the resolution decreases due to a characteristic of the optical low pass filter. On the other hand, when imaging is performed using the imaging unit including no optical low pass filter, moiré occurs depending on the subject, but there is a merit in that a high resolution image can be obtained. In the present photographing form, since an image with less moiré and an image with high resolution can be imaged at the same time, there is an effect that it is possible to select a captured image intended by a photographer in accordance with a subject.

In each of the photographing forms of the present embodiment, the content of the first to third embodiments may be combined.

Figure 18:
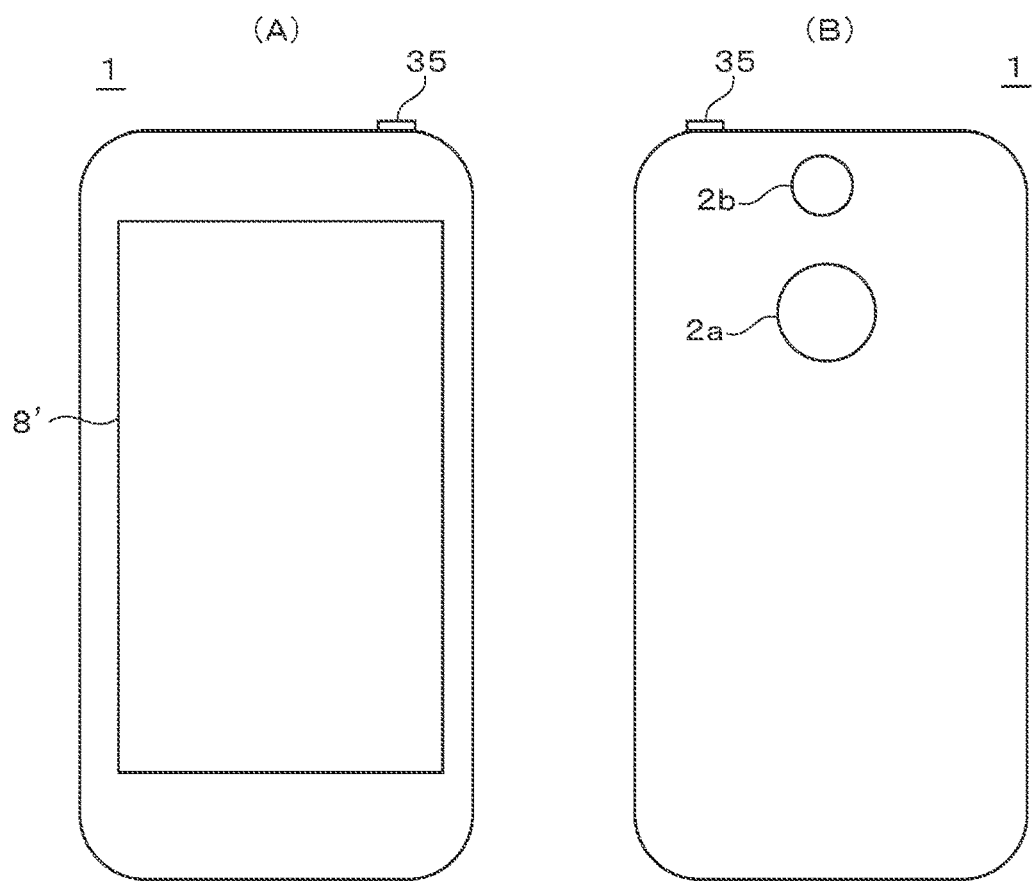
FIG. 18 is an external diagram illustrating an example of an imaging apparatus in a fourth embodiment.

FIG. 18 is an external diagram illustrating an example of the imaging apparatus in the present embodiment, and (A) is a rear view and (B) is a front view. A difference from FIG. 3 lies in that the lens unit 2a and the lens unit 2b are arranged in the horizontal direction in FIG. 3, whereas the lens unit 2a and the lens unit 2b are arranged in the vertical direction in FIG. 18. The lens unit 2a may be fixed type, and the lens unit 2b may be a removable type lens.

Figure 19:
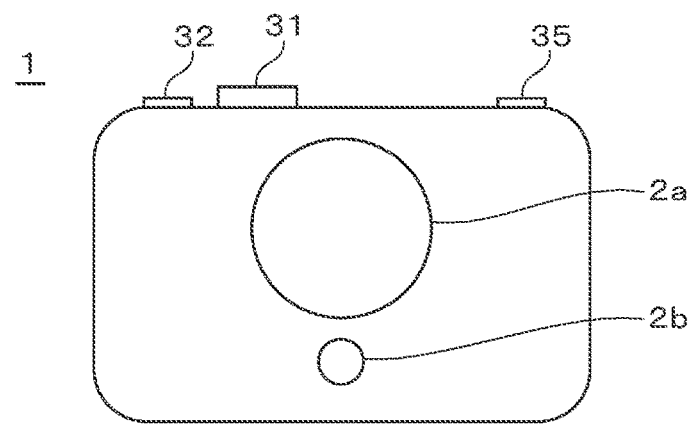
FIG. 19 is an external diagram illustrating another example of an imaging apparatus in the fourth embodiment.

FIG. 19 is an external diagram, that is, a rear view illustrating another example of the imaging apparatus in the present embodiment. A difference from FIG. 2 lies that the lens unit 2a and the lens unit 2b are arranged in the horizontal direction in FIG. 2, whereas the lens unit 2a and the lens unit 2b are arranged in the vertical direction in FIG. 19. Similarly, different imaging units with different focal distances may be used in the lens unit 2a and the lens unit 2b. The lens unit 2a may be a fixed type, and the lens unit 2b may be a detachable lens similarly to FIG. 18.

In a case in which the lens units 2a and 2b are arranged in the vertical direction, there is a merit in that horizontal parallax between the two imaging units does not occur. Here, it is not suitable in a case in which it is desired to set parallax between the two imaging units as in 3D imaging or panorama imaging.

As described above, according to the present embodiment, it is possible to provide an imaging apparatus with excellent usability which is capable of performing imaging through cooperation of a plurality of imaging units in response to a single photographing instruction given by the manipulation unit and controlling a plurality of imaging units simultaneously with a simple manipulation so that imaging is performed in a plurality of photographing modes, similarly to the first embodiment.

Fifth Embodiment

In the present embodiment, another appearance of the imaging apparatus will be described.

Figure 20:
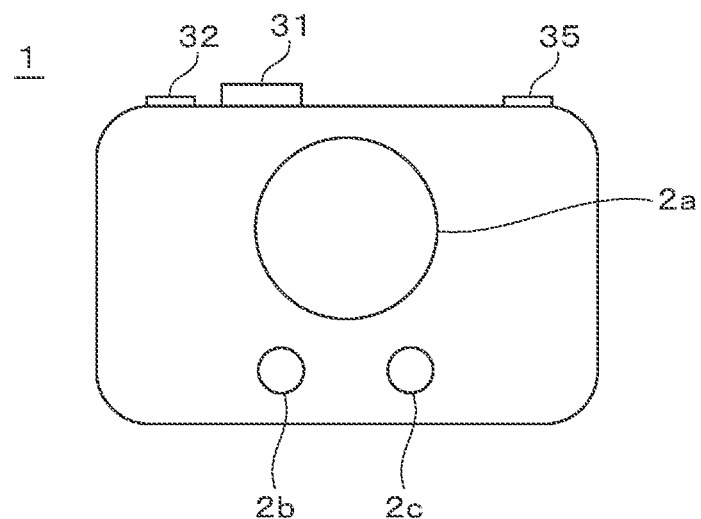
FIG. 20 is an external diagram illustrating an example of an imaging apparatus in a fifth embodiment.

FIG. 20 is an external diagram, that is, a rear view illustrating an example of an imaging apparatus in the present embodiment. A difference from FIG. 19 lies in that the number of lens units is increased from two to three. Three imaging units, that is, imaging units 3a, 3b, and 3c (not illustrated) are necessary corresponding to the lens units. For example, the operations described in the first to fourth embodiments are performed by the lens units 2b and 2c, and normal photographing is performed in the lens unit 2a. It is possible to perform still image capturing or moving image capturing by the lens unit 2a and distance detection and a recognition process by lens units 2b and 2c independently, and it is possible to perform higher-speed high-performance imaging.

As described above, in the present embodiment, the imaging apparatus including a plurality of imaging units includes a unit that performs a setting related to control of an imaging unit in a plurality of imaging units individually, a unit that controls a plurality of imaging units in a cooperative manner, and a manipulation unit. Accordingly, it is possible to perform imaging through cooperation of a plurality of imaging units in response to a single photographing instruction by the manipulation unit.

Sixth Embodiment

FIG. 21 is a block diagram illustrating a configuration of an imaging apparatus in the present embodiment. In FIG. 21, the same reference numerals are assigned to functions similar to those in FIG. 1, and a description thereof will be omitted. A difference between FIG. 21 and FIG. 1 lies in that a video/audio signal processing circuit 20, a microphone 16, a speaker 17, and a proximity sensor 18 are provided, and the lens unit 2a and the lens unit 2b are lenses with different focal distance. The focal distances of the lens unit 2a and the lens unit 2b are arbitrary, but the lens unit 2b has a narrower angle than the lens unit 2a, and the lens unit 2a has a wider angle than the lens unit 2b. Further, although specifications such as the sizes of the imaging units 3a and 3b, the number of pixels, and the like may be identical or may be different, the imaging unit 3a is an imaging unit for a wide angle image, and the imaging unit 3b is an imaging unit for a narrow angle image.

The video/audio signal processing circuit 20 also has an audio signal processing function in addition to the image processing of the image signal processing circuit 5 in FIG. 1, and performs predetermined audio signal processing such as encoding of an audio input from the microphone 16. The video/audio signal processing circuit 20 also decodes the encoded audio signal and causes the decoded audio signal to be output from the speaker 17.

In addition to the functions described in FIG. 1, the proximity sensor 18 is connected to the control circuit 6, and the control circuit 6 controls the proximity sensor 18 connected thereto in accordance with the operation mode. Further, the control circuit 6 controls the display 8, the encoding/decoding circuit 15, and the recording/reproducing circuit 10 via the video/audio signal processing circuit 20 or directly.

As described above, according to the present embodiment, the encoding/decoding circuit 15 controls the imaging units 3a and 3b, the video/audio signal processing circuit 20, the display 8, the recording/reproducing circuit 10, and the like in accordance with the operation mode preset by the user manipulation by the control circuit 6. With such control, it is possible to control the imaging unit 3a and the imaging unit 3b independently such that imaging is performed, perform imaging through the cooperation of the imaging unit 3a and the imaging unit 3b, controls the imaging unit 3a and the imaging unit 3b simultaneously such that simultaneous photographing of the still image and the moving image is performed, perform the moving image capturing by one imaging unit and perform the still image capturing by the other imaging unit during recording, or capture the moving image at the same time. Further, it is possible to perform control such that any one of the image signal captured in the imaging unit 3a, the image signal captured in the imaging unit 3b, or an image signal generated by combining the image signal captured in the imaging unit 3a and the image signal captured in the imaging unit 3b is displayed or recorded.

An external diagram illustrating an example of the imaging apparatus in the present embodiment illustrates a configuration in which the lens units 2a and 2b are vertically arranged, and the display 8 integrated with the touch panel is arranged on the back side, for example, as illustrated in FIG. 18. Further, the lens units 2a and 2b are arranged at predetermined intervals to have substantially the same optical axis direction. The lens units 2a and 2b may be arranged side by side and may be a fixed type or a detachable type. The user manipulation can be performed by the touch panel described above, a manipulation unit constituted by hardware such as a shutter button may be installed.

Next, a photographing mode in the present embodiment will be described in detail. FIGS. 22 and 23 illustrate a list of photographing modes in the present embodiment, FIG. 22 is a list of normal photographing modes, and FIG. 23 is a list of simultaneous photographing modes. The normal photographing mode illustrated in FIG. 22 is a mode in which photographing is performed by one of the imaging units 3a and 3b and includes a still image capturing mode of a mode 1 and a moving image capturing mode of a mode 2. The simultaneous photographing mode of FIG. 23 is an operation mode in which a wide angle image and a narrow angle image are simultaneously captured by the imaging units 3a and 3b and includes moving image still image simultaneous photographing of a mode 3, still image simultaneous photographing of a mode 4, and a moving image simultaneous photographing of a mode 5. In the tables of FIG. 22 and FIG. 23, a photographing mode, a wide angle imaging unit, a narrow angle imaging unit, and an operation are described from the top in a leftmost column, and distinction of still images and moving images captured by the narrow angle imaging unit and the wide angle imaging unit and an overview of operations of the respective modes are described for the photographing mode 1 to 5.

First, the still image capturing mode of the mode 1 of FIG. 22 will be described. This mode is a mode in which a still image of a wide angle or a narrow angle is captured using either of the two imaging units 3a and 3b. An imaging unit to use depends on a zoom magnification set by a zoom manipulation. The zoom includes an optical zoom for zooming with a zoom lens and an electronic zoom for performing an enlarging process through signal processing, and any one of schemes including a combination of both schemes may be employed, but in the following description, it is assumed that the lens unit 2a and 2b are lenses with a fixed focal length, and the zoom process is performed by the electronic zoom. Focal distances of the wide angle lens unit 2a and the narrow angle lens unit 2b are indicated by fa and fb, respectively. Since the wide angle lens unit has a smaller focal distance, fa<fb. If a state of the focal distance fa is set as a zoom magnification 1×, and an electronic zoom magnification by the imaging unit 3a is indicated by Ma, it is desirable to set the electronic zoom magnification in a range of $1 \leq Ma \leq (fb/fa)$. Further, if the electronic zoom magnification by the narrow angle imaging unit 3b is indicated by Mb, it is desirable to set the electronic zoom magnification in a range of $1 \leq Mb < Mm$. Here, Mm indicates a maximum value of the electronic zoom magnification with respect to the imaging unit 3b. Although the value of Mm is arbitrary, since the resolution decreases as the electronic zoom magnification is increased, it is desirable to decide the maximum value Mm in an allowable image quality range.

Figure 24:
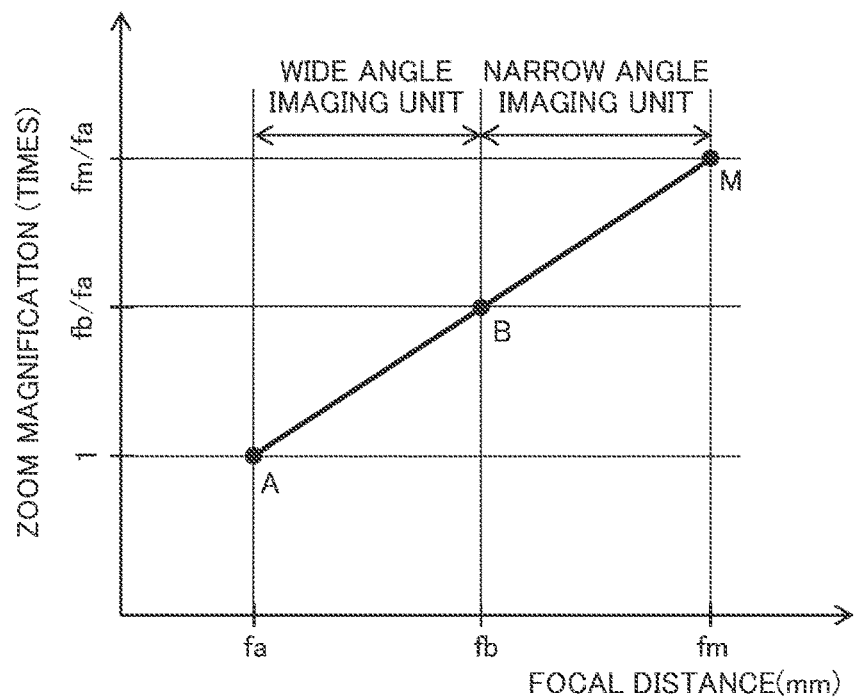
FIG. 24 is an explanatory diagram of a relation between a focal distance and a zoom magnification in the sixth embodiment.

FIG. 24 illustrates a relation between the focal distance and the zoom magnification when the zoom magnification is defined on the basis of the wide angle imaging unit 3a. As illustrated in FIG. 24, when zooming is performed in a range in which a focal distance f is fa≤f<fb, imaging is performed by the wide angle imaging unit 3a. At this time, the electronic zoom magnification Ma of the wide angle imaging unit 3a is controlled in the above range. When zooming is performed in a range in which the focal distance f is fb≤f<fm, imaging is performed by the narrow angle imaging unit 3b. At this time, the electronic zoom magnification Mb of the narrow angle imaging unit 3b is controlled in the above range. If the zoom magnification at this time in the case of the focal distance fa of the wide angle imaging unit is used as the reference (1×) of the zoom magnification, it is possible to continuously zoom from 1× to fb/fa times by the wide angle imaging unit and from fb/fa times to fm/fa times by the narrow angle imaging unit. For example, if the focal distance fa indicated by 35 mm conversion is set to 20 mm and fb is set to 50 mm, it is desirable to control the electronic zoom of the wide angle imaging unit in a range of 1 to 2.5 times. If fm is equivalent to, for example, 200 mm, it is desirable to control the electronic zoom for the narrow angle imaging unit in a range from 1 to 4 times, and the combined zoom magnification of the wide angle imaging unit and the narrow angle imaging unit becomes a maximum of 10 times. In the above description, the electronic zoom has been described as the zoom, but the optical zoom may be employed using a zoom lens.

Figure 25:
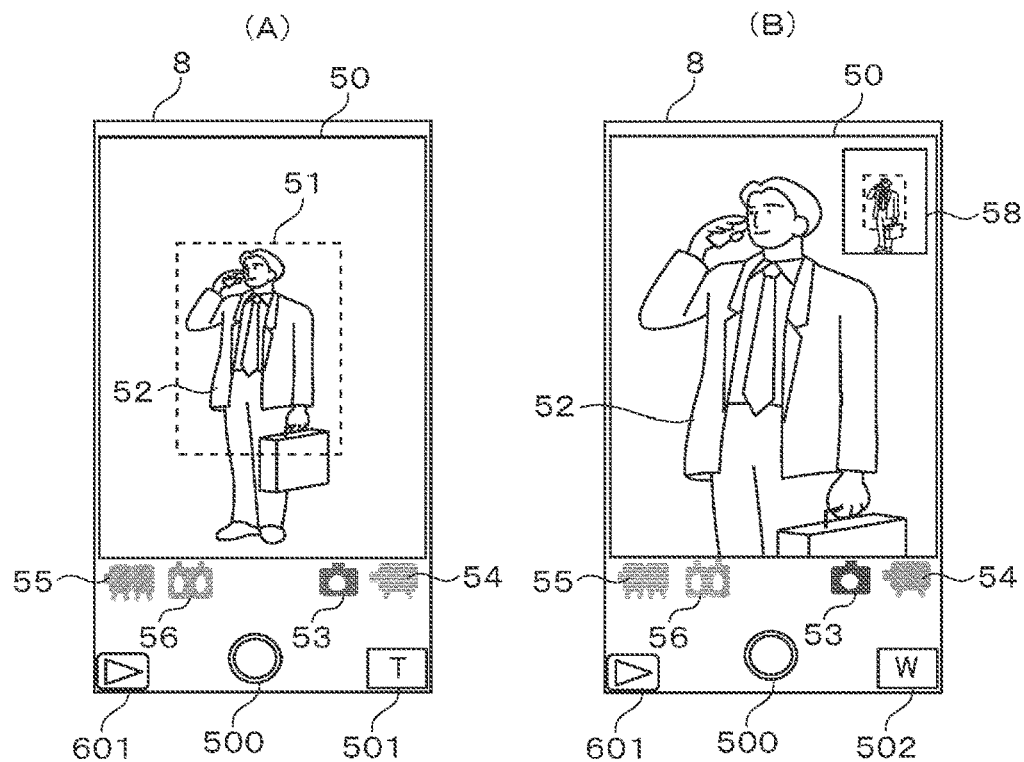
FIG. 25 is an explanatory diagram of a screen display of a still image capturing mode in the sixth embodiment.

FIG. 25 is an explanatory diagram of a 1-screen display in the still image capturing mode of the mode 1, (A) of FIG. 25 illustrates an example in which a wide angle image captured by the imaging unit 3a is displayed, and (B) of FIG. 25 illustrates an example in which a narrow angle captured by the imaging unit 3b is displayed. In (A) and (B) of FIG. 25, reference numeral 8 indicates a display screen. Reference numeral 52 indicates a person of a subject. Reference numerals 53 to 56 indicate photographing mode setting icons, and 53 indicates a still image capturing mode icon, 54 indicates a moving image capturing mode icon, 55 indicates a moving image simultaneous capturing mode icon, and 56 indicates a still image simultaneous capturing mode icon. The user can set the photographing mode by touching a desired photographing mode icon. This setting is performed such that the control circuit 6 (FIG. 21) detects the user manipulation on the touch panel and controls the imaging units 3a and 3b, the interface circuit 4, and the video/audio signal processing circuit 20. In the example of FIG. 25, the still image capturing mode icon 53 is selected, and the icon of the selected mode is displayed to be distinguished from an icon of a non-selected mode so that the selected icon can be determined, and, for example, the luminance of the icon of the selected mode is increased. Reference numeral 500 indicates a still image capturing button, and when this button is touched at the time of photographing, photographing or recording is performed. In a standby state before photographing, a moving image being captured by the imaging unit 3a or 3b is displayed on an image display unit 50 on the display in real time as already described above. In (A) of FIG. 25, reference numeral 51 indicates a frame indicating a narrow angle image region, and it is possible to understand a photographing angle of view of the narrow angle image while monitoring the wide angle image. Further, the frame indicating the narrow angle image region 51 may be switched not to be displayed. Further, the narrow angle image may be displayed as a sub screen. Reference numeral 601 indicates a reproducing mode button, and this button is touched when transition to the reproducing mode to be described later is performed.

The switching between the wide angle image display and the narrow angle image display of (A) and (B) of FIG. 25 is performed when an angle-of-view switching button 501 or 502 on the display is touched. Further, the zoom manipulation is performed by pinch-in and pinch-out manipulations on the touch panel. It is desirable that the continuous zoom manipulation is performed using the angle-of-view switching buttons 501 and 502 in a case in which pinch-in, pinch-out, the wide angle image, and the narrow angle image are instantaneously switched.

In the narrow angle image display of (B) of FIG. 25, reference numeral 58 indicates a wide angle photographing region which is reduced and displayed superimposed on the narrow angle image. In a case in which the still image is captured, similarly to the case of the wide angle image display of (A) of FIG. 25, a narrow angle image is photographed and recorded by touching the shutter button. The manipulation of the shutter button may be performed such that the pressing of the touch panel is detected, two-step control is performed, the half-pressed state of the shutter button is determined when the pressing is weak, the fully-pressed state is determined when the pressing becomes a predetermined value or more, exposure control and focus control are performed in the half-pressed state, and the photographing operation is performed in the fully-pressed state.

In the still image capturing mode of the mode 1, since the imaging unit 3a or 3b is automatically switched in accordance with the zoom manipulation performed by an angle angle-of-view switching button or the pinch-in or out manipulation and perform imaging, the user can manipulate the apparatus with a sense similar to that of a camera including a single imaging unit, and the usability is good.

Figure 26:
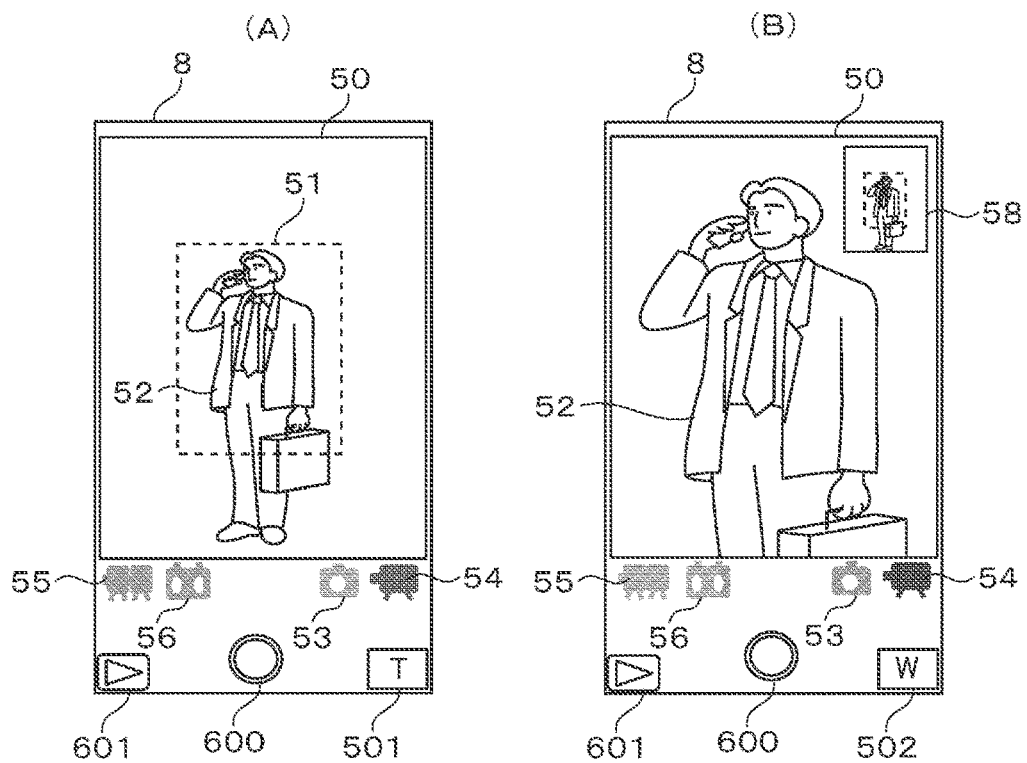
FIG. 26 is an explanatory diagram of a screen display of a moving image capturing mode in the sixth embodiment.

Next, the moving image capturing mode of the mode 2 will be described. FIG. 26 is an explanatory diagram of a 1-screen display in the moving image capturing mode, and (A) of FIG. 26 illustrates an example in which a wide angle image captured by the imaging unit 3a is displayed, and (B) of FIG. 26 illustrates an example in which a narrow angle image captured by the imaging unit 3b is displayed. Except for a difference in which FIG. 25 illustrates the still image capturing mode, and FIG. 26 illustrates the moving image capturing mode, switching between the wide angle image and the narrow angle image, the zoom manipulation by the pinch-in or pinch-out manipulation, and the like are substantially similar to those in the example of the still image capturing mode in FIG. 25. In the present moving image capturing mode, a moving image capturing mode icon 54 is selected as the photographing mode setting icon. In a case in which a moving image is captured, a moving image capturing button 600 is touched. if the moving image capturing button 600 is touched, similarly to the case of the still image capturing, the control circuit 6 detects the touch and controls the imaging unit, the signal processing unit, and the like such that the moving image capturing, the signal processing, the recording, and the like are executed. The moving image capturing button 600 is distinctively displayed by changing the edge of the still image capturing button 500 in FIG. 25.

Figure 27:
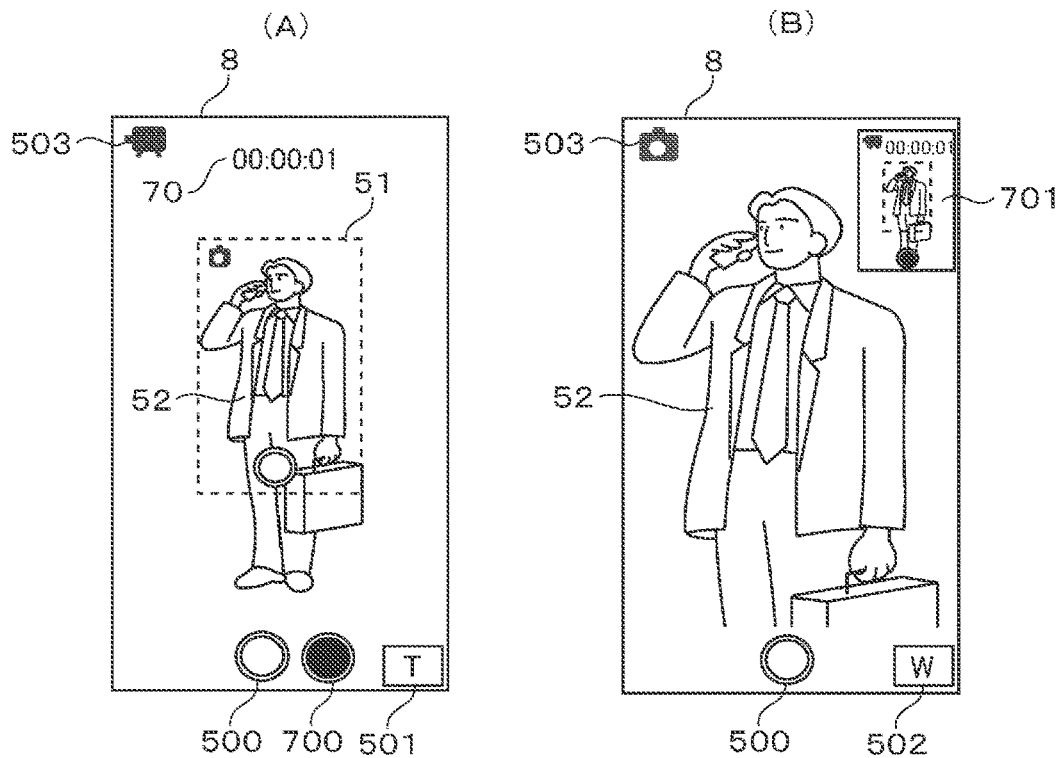
FIG. 27 is an explanatory diagram of a display screen during wide angle image recording in a moving image capturing mode in the sixth embodiment.

FIG. 27 illustrates a display screen in the moving image capturing mode, that is, a display screen during wide angle image recording. (A) of FIG. 27 illustrates a screen of the wide angle image, and (B) of FIG. 27 illustrates a screen display example when switching to the narrow angle image display is performed by an angle angle-of-view switching button 501 during wide angle image capturing. (A) of FIG. 27 illustrates a screen during moving image recording, a moving image capturing end button 700 is displayed. Further, reference numeral 70 indicates an elapsed time indication which indicates the elapsed time after photographing is started. If the moving image capturing end button 700 is touched, the moving image capturing or recording ends. In the narrow angle image display of (B) of FIG. 27, since the narrow angle image recording is not executed, the moving image capturing end button is not displayed. Here, the still image capturing is possible, and it is possible to capture the moving image of the wide angle image and capture the still image of the narrow angle image during recording by touching the still image capturing button 500. At this time, a reduced image 701 of the wide angle image obtained by reducing the wide angle image display similar to that illustrated in (A) of FIG. 27 is superimposed and displayed, and thus it can be understood that the moving image of the wide angle is being captured. Further, reference numeral 503 indicates a display mode icon for indicating a mode of the screen, and in the case of (A) of FIG. 27, it indicates the moving image capturing mode, and in the case of (B) of FIG. 27, it indicates the still image capturing mode in which the still image of the narrow angle image can be captured.

In the screen (A) of FIG. 27 in which the moving image of the wide angle image is being captured, when a zoom-up operation is performed by the pinch-out manipulation, the electronic zoom process is executed, and photographing and recording are continued in the zoomed state in accordance with the manipulation. As the zoom-up operation is further performed, when the zoom magnification corresponding to the focal distance of the narrow angle image is reached (a point B in FIG. 24), two operations are considered. One is an operation of continuing the imaging by the imaging unit 3a of the wide angle image, and the other is an operation of causing the imaging unit 3b of the narrow angle image to take over the moving image capturing operation and continue the recording, and any of the methods may be employed.

In (A) of FIG. 27, it is possible to capture and record the wide angle still image during the wide angle moving image recording. Here, since the wide angle moving image is being captured and recorded, the image size of the still image to be recorded or the like is restricted. On the other hand, since the narrow angle imaging unit does not perform the imaging and recording operations, it is possible to capture and record a high-quality narrow angle still image during the wide angle moving image recording.

Figure 28:
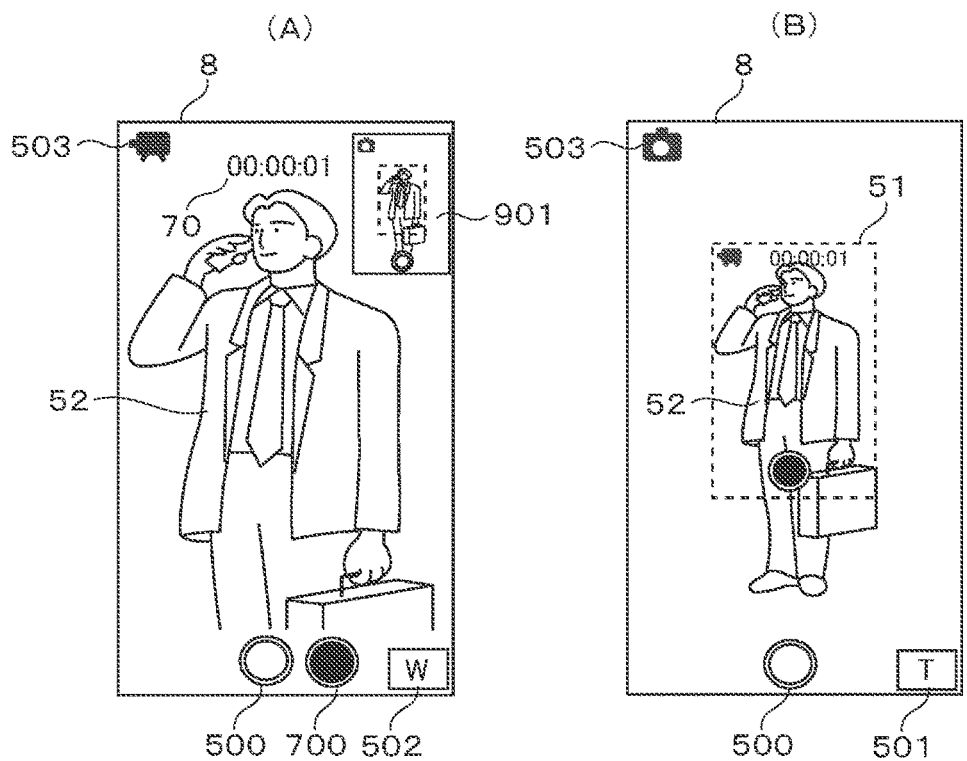
FIG. 28 is an explanatory diagram of a display screen during narrow angle image recording in a moving image capturing mode in the sixth embodiment.

FIG. 28 illustrates a display screen of the moving image capturing mode, and FIG. 27 illustrates the display screen during wide angle image recording, whereas (A) of FIG. 28 illustrates a display screen during narrow angle image recording. To end the narrow angle image recording, it is desirable to touch the moving image capturing end button 700. If it is switched to a screen of (B) of FIG. 28 by the angle-of-view switching button 502, the wide angle image can be displayed. Since the wide angle image of (B) of FIG. 28 is not being recorded, the moving image capturing end button is not displayed. Here, at this time, it is possible to capture the still image of the wide angle image while the moving image of the narrow angle image is being captured.

In the moving image capturing mode of the mode 2 described above, it is possible to capture the narrow angle still image at arbitrary timing while the wide angle moving image is being captured and recorded, and similarly, it is possible to capture the wide angle still image at an arbitrary timing while the narrow angle moving image is being captured and recorded. As described above, it is possible to capture the still image while the moving image is being captured and recorded, and the moving image capturing mode also serves as the moving image still image simultaneous photographing mode of the mode 3 illustrated in FIG. 23.

Further, it is desirable that the still images captured during the moving image capturing be grouped for when they are reproduced in association with one another at the time of reproducing. To this end, information indicating that they belong to the same group may be recorded in a moving image file or a still image file to be recorded, and information indicating a timing at which the still image is captured may be recorded in the moving image.

Figure 29:
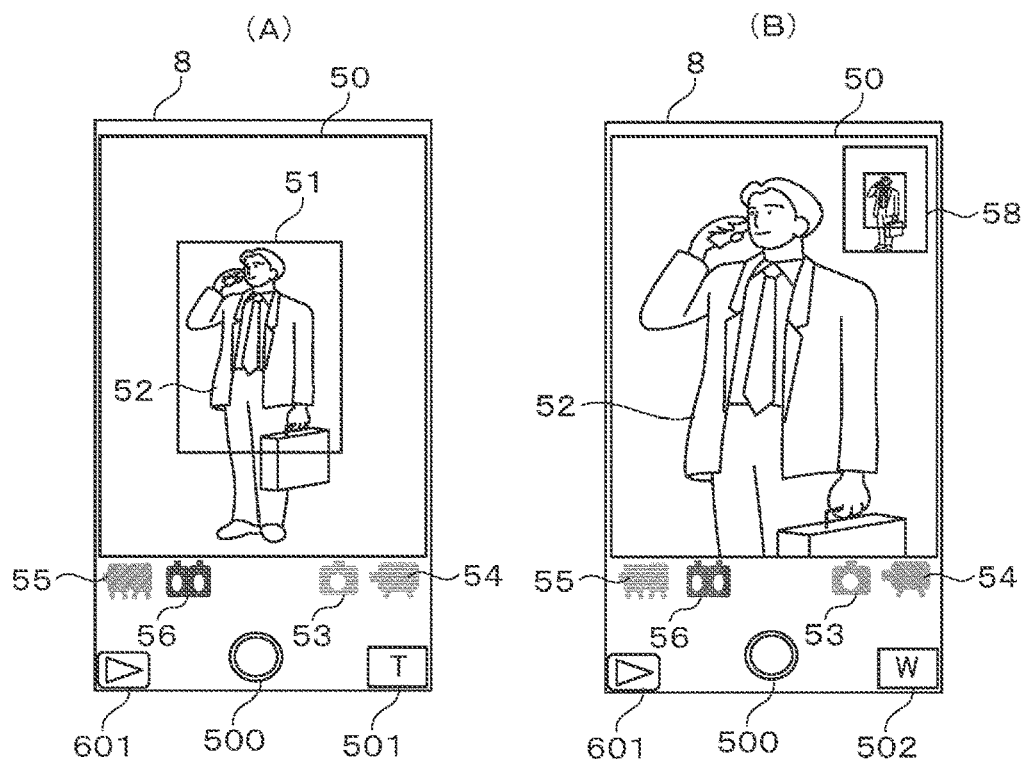
FIG. 29 is an explanatory diagram of a screen display of a still image simultaneous capturing mode in the sixth embodiment.

Next, the still image simultaneous capturing mode of the mode 4 illustrated in FIG. 23 will be described. FIG. 29 is an explanatory diagram of a display screen in the still image simultaneous capturing mode. In (A) and (B) of FIG. 29, a still image simultaneous capturing mode icon 56 selected, and content of the screen display is similar to that in the still image capturing mode of FIG. 25. In the still image capturing mode, if photographing is performed by touching the shutter button, either of the still image of the wide angle and the still image of the narrow angle is captured, whereas in the still image simultaneous capturing mode, it is possible to capture and record both of the still image of the wide angle and the still image of the narrow angle at the same time through a single shutter button manipulation. It is desirable that the still image of the wide angle and the still image of the narrow angle captured at the same time be grouped for when they are reproduced in association with one another at the time of reproducing. To this end, information indicating that they belong to the same group may be recorded in a moving image file or a still image file to be recorded.

If the display screens of the two modes, that is, the still image capturing mode of the mode 1 and the still image simultaneous capturing mode of the mode 4 are similar, it is difficult for the user to understand a mode which is set. In this regard, for example, shapes of the shutter buttons or shutter sounds may be set to be different between the two modes in addition to the photographing mode icon, and thus it is possible to easily identify a currently set mode. In order to increase the speed at which recording and reproducing are performed, a plurality of recording/reproducing circuits and a plurality of recording mediums may be disposed, and the still image of the wide angel and the still image of the narrow angle may be stored in different recording mediums.

Figure 30:
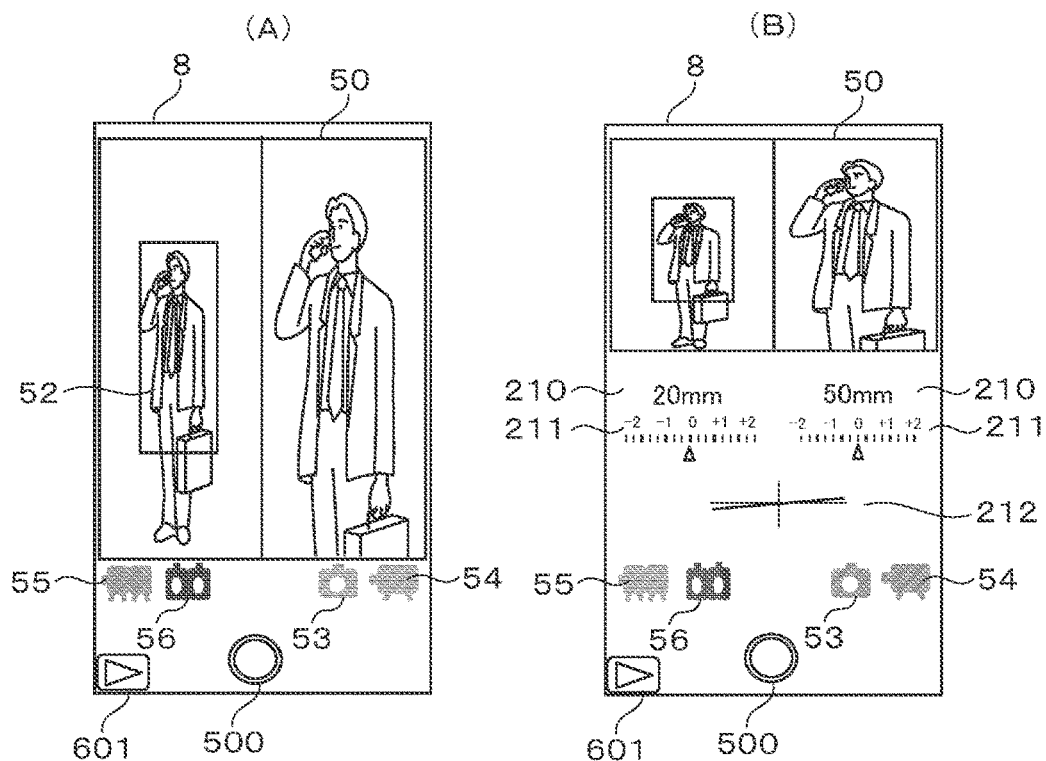
FIG. 30 is an explanatory diagram of a 2-screen display of a still image simultaneous capturing mode in the sixth embodiment.

FIG. 30 is an explanatory diagram of a 2-screen display in the still image simultaneous capturing mode. In this display method, a screen of a wide angle image and a screen of a narrow angle image of (A) and (B) of FIG. 29 are arranged side by side in a 2-screen manner and displayed at the same time. In this display, preferably, for example, when a narrow angle image region 51 is touched in the screen of (A) of FIG. 29, and it moves to the edge of the screen, transition to a 2-screen display of (A) of FIG. 30 is performed, or the display can be switched by a method of installing a dedicated display switching button (not illustrated) or the like.

In (A) of FIG. 30, images are displayed to be vertically long, whereas in (B) of FIG. 30, images are reduced at an aspect ratio of an original image and displayed. At this time, relevant photographing information may be displayed in a display space. In (B) of FIG. 30, a focal distance display 210, an exposure level display 211, and a level indicator 212 are displayed as the relevant photographing information display, but any other photographing information may be displayed.

Figure 31:
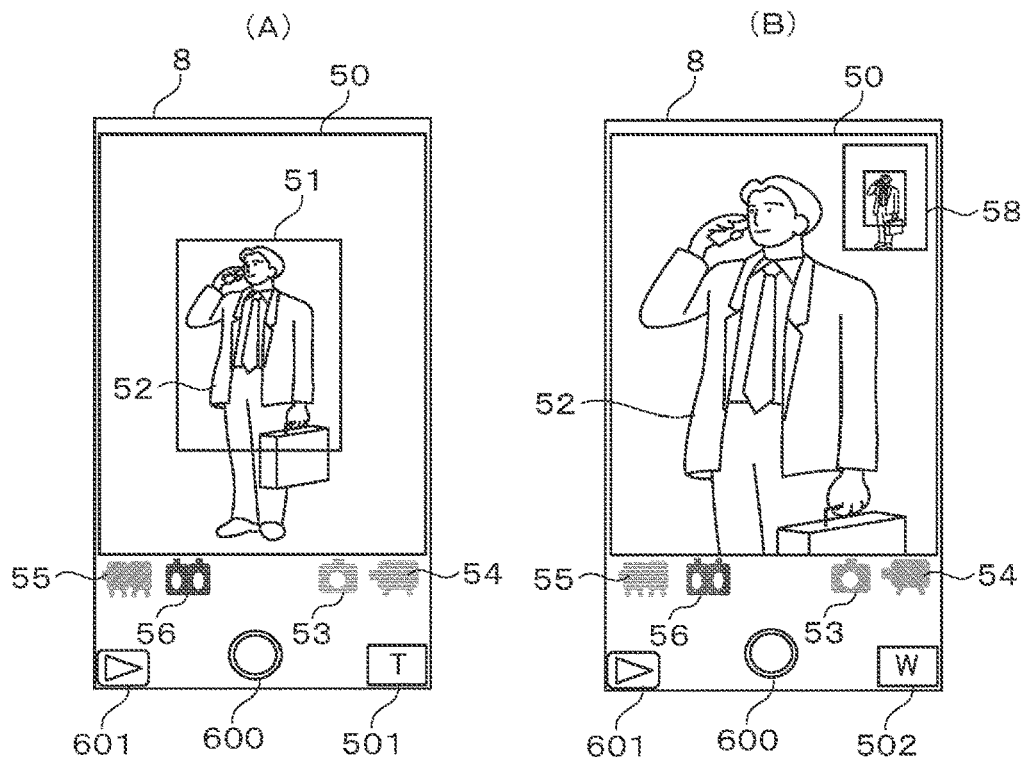
FIG. 31 is an explanatory diagram of a screen display of a moving image simultaneous capturing mode in the sixth embodiment.

FIG. 31 is an explanatory diagram of a 1-screen display in the moving image simultaneous capturing mode of the mode 5 illustrated in FIG. 23. (A) of FIG. 31 illustrates the display screen of the wide angle image, and (B) of FIG. 31 illustrates the display screen of the narrow angle image. Except that a moving image simultaneous capturing mode icon 55 is selected, and capturing and recording of the moving image are started when the moving image capturing button 600 is touched, content of the screen display is substantially similar to the display of the still image simultaneous capturing mode of FIG. 29. In this photographing mode, when the moving image capturing button 600 is touched, and the moving image capturing is performed, both imaging units, that is, the wide angle imaging unit 3a and the narrow angle imaging unit 3b capture and record the wide angle moving image and the narrow angle moving image at the same time. In order to increase the speed at which recording and reproducing are performed, a plurality of recording/reproducing circuits and a plurality of recording mediums may be disposed, and the moving image of the wide angel and the moving image of the narrow angle may be stored in different recording mediums.

Figure 32:
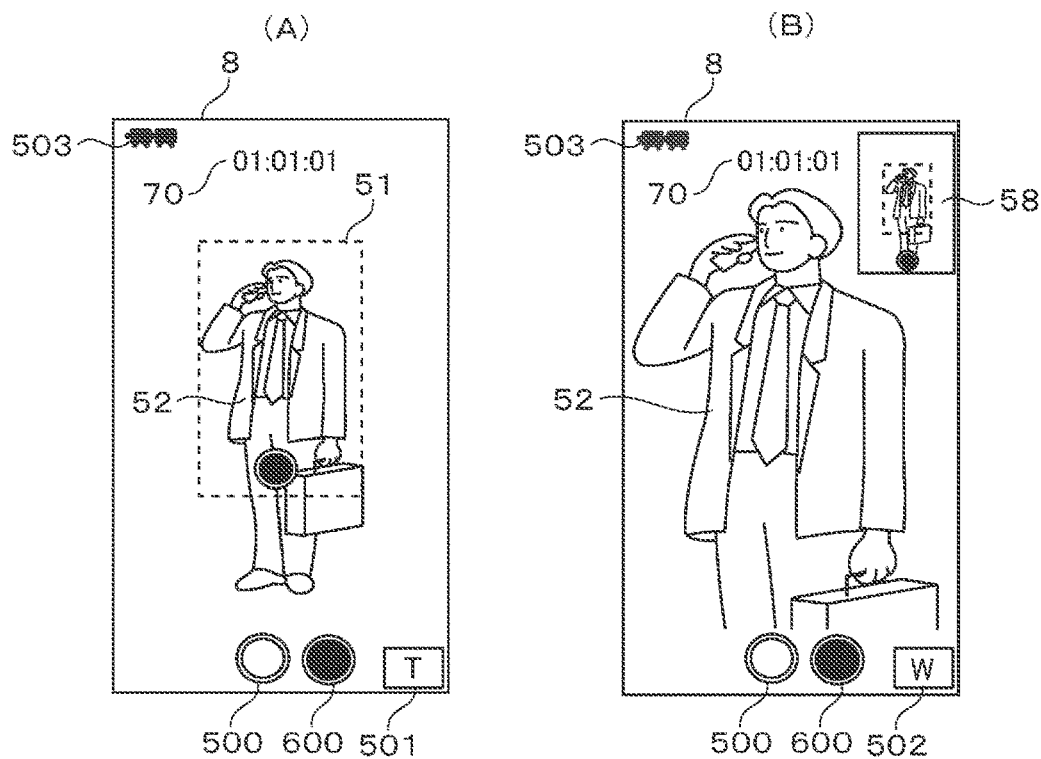
FIG. 32 is an explanatory diagram of a screen display during moving image simultaneous recording in a moving image simultaneous capturing mode in the sixth embodiment.

FIG. 32 is a display screen during moving image simultaneous recording in the moving image simultaneous capturing mode, and (A) of FIG. 32 illustrates the display screen of the wide angle image, and (B) of FIG. 32 illustrates the display screen of the narrow angle image. It is possible to capture the still image capturing while the moving image is being recorded. Here, both the wide angle imaging unit and the narrow angle imaging unit are performing the moving image capturing operation, and a size of a still image to be captured and a timing are restricted.

Figure 33:
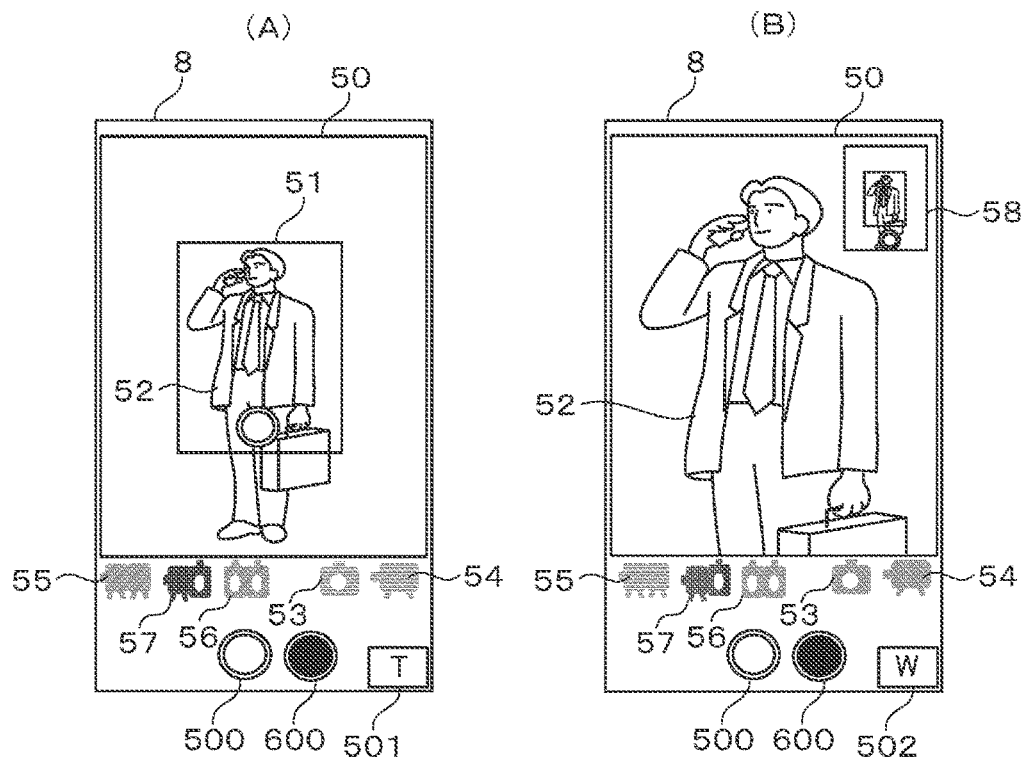
FIG. 33 is an explanatory diagram of a screen display of a moving image still image simultaneous capturing mode in the sixth embodiment.

FIG. 33 is an explanatory diagram of a 1-screen display in the moving image still image simultaneous capturing mode of the mode 3 illustrated in FIG. 23. The moving image still image simultaneous capturing mode has been described as the operation in the moving image capturing mode with reference to FIGS. 27 and 28, whereas FIG. 33 illustrates an example in which a moving image still image simultaneous capturing mode-dedicated icon 57 is installed. In a case in which the moving image still image simultaneous photographing-dedicated mode is provided as described above, the still image capturing function in the moving image capturing mode may be omitted.

In the above embodiments, the imaging apparatus having the five photographing modes illustrated in FIGS. 22 and 23 has been described, but the imaging apparatus may not have all the photographing modes, and, for example, the imaging apparatus may have only the still image capturing mode of the mode 1 and the still image simultaneous capturing mode of the mode 2 which are related to the still image, and it is desirable for the imaging apparatus to have one or more of the five modes such as the modes 1, 2, 3, and 4.

Figure 34:
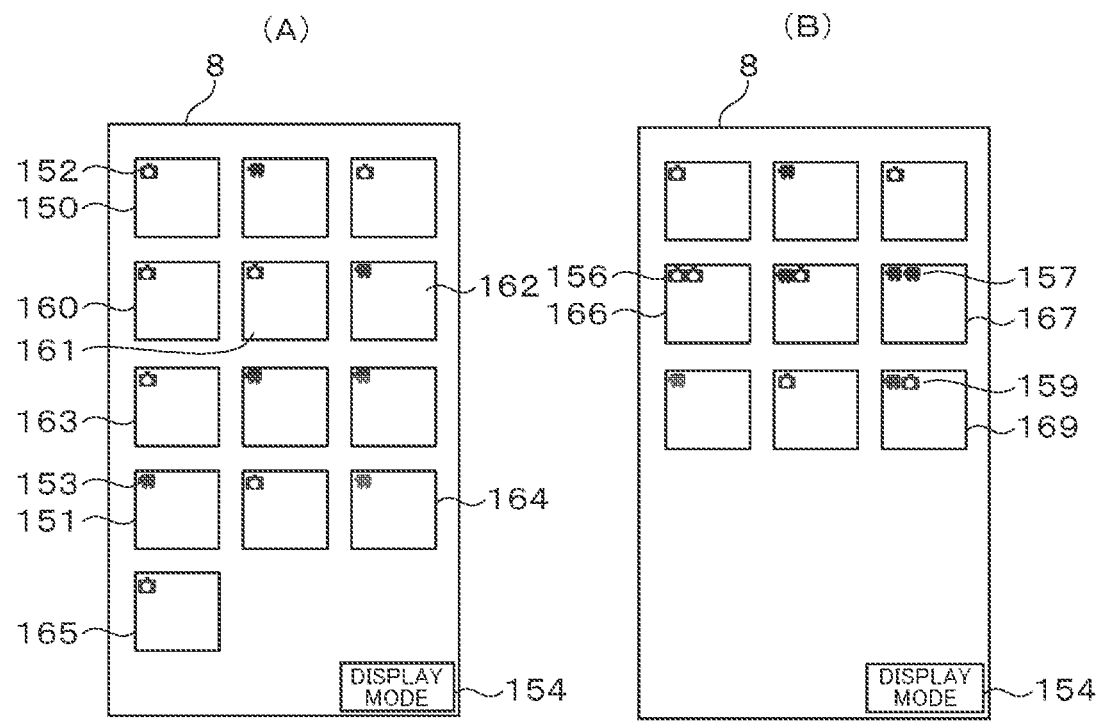
FIG. 34 is an explanatory diagram of a screen display of a reproducing mode in the sixth embodiment.

Next, a reproducing mode of the present embodiment will be described. FIG. 34 is an explanatory diagram of a reproducing mode screen display in the present embodiment. To display a reproducing mode screen, preferably, for example, a reproducing mode button 601 is touched in the photographing mode screen of FIG. 25 or the like, and the control circuit detects the touching and causes transition to the reproducing mode to be performed. In (A) of FIG. 34, reference numerals 150, 151, 160 to 164, and the like indicate thumbnail images, and the thumbnail images which are reduced data of a plurality of image data recorded in a recording medium are arranged and displayed two-dimensionally. An arrangement order of each image corresponds to an order at the time of recording. Pictures of the thumbnail image in FIG. 32 are not illustrated, but actually, each thumbnail image is reproduced and displayed as a reduced image. Reference numeral 152 indicates a still image icon, and reference numeral 153 indicates a moving image icon, and they indicate whether image data corresponding to each thumbnail is a still image or a moving image. In FIG. 34, the icons identifying the still image or the moving image is added to the thumbnail, but any other display method capable of identifying the still image or the moving image may be employed.

It is possible to perform switching to the screen of (B) of FIG. 34 by touching a display mode button 154 in the screen of (A) of FIG. 34. In (B) of FIG. 34, reference numeral 156 indicates a still image simultaneous capturing mode icon, reference numeral 157 indicates a moving image simultaneous capturing mode icon, and reference numeral 159 indicates a moving image still image simultaneous capturing mode icon, and they indicate the photographing modes in which the images corresponding to the respective thumbnails are captured. A thumbnail 166 in (B) of FIG. 34 corresponds to two thumbnails 160 and 161 in (A) of FIG. 34. These images correspond to two images captured in the still image simultaneous capturing mode. Similarly, thumbnails 167 and 169 in (B) of FIG. 34 correspond to thumbnails 162 and 151 and thumbnails 164 and 165 in (A) of FIG. 34, respectively.

Figure 35:
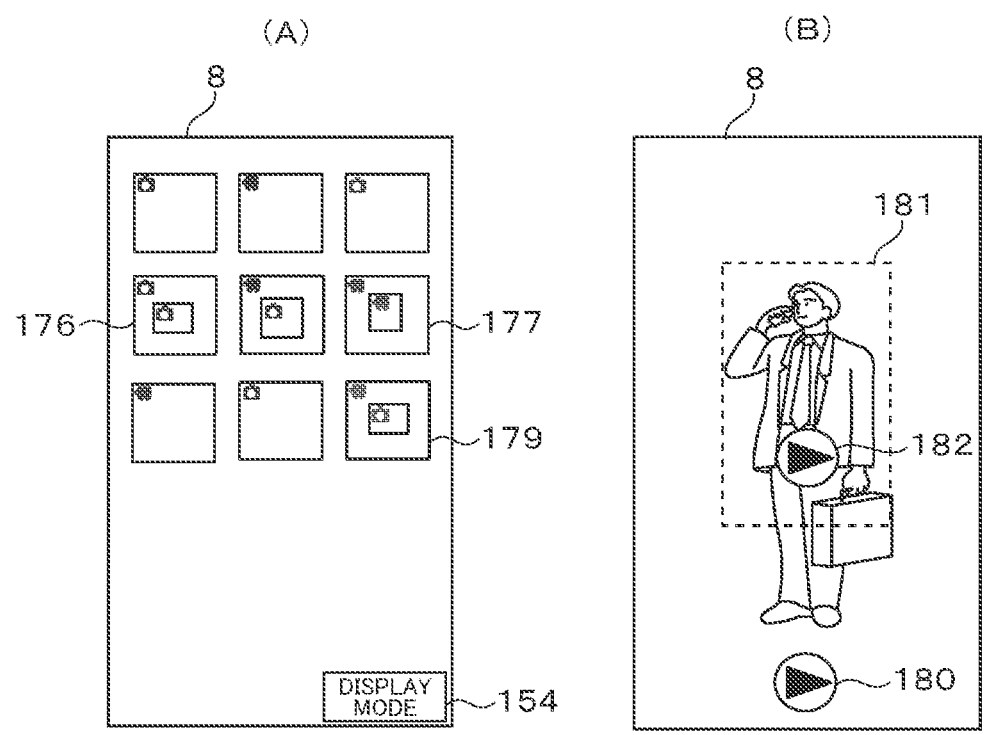
FIG. 35 is an explanatory diagram of another screen display of a reproducing mode in the sixth embodiment.

FIG. 35 is an explanatory diagram of another display method of the reproducing mode screen display in the present embodiment. (A) of FIG. 35 illustrates another display method illustrating content equivalent to that of (B) of FIG. 34, and a narrow angle image region and the icon identifying the moving image or the still image are added to a thumbnail of a wide angle image and displayed. Thumbnail images 166, 167, and 169 in (B) of FIG. 34 correspond to thumbnail images 176, 177, and 179 in (A) of FIG. 35.

(B) of FIG. 35 illustrates a representative screen of a wide angle moving image corresponding to an image of the thumbnail image 177 displayed when the thumbnail image 177 of (A) of FIG. 35 is selected. If a reproducing button 180 is touched, the wide angle moving image can be played. Reference numeral 181 indicates a frame indicating a narrow angle image region, and a reproducing button 182 of the narrow angle image may be displayed, and when the button is touched, the moving image of the narrow angle may be reproduced directly. Similarly in the still image, first, it is displayed at the wide angle, and the still image of the narrow angle is reproduced by the reproducing button of the narrow angle image.

In (B) of FIG. 34 and (A) of FIG. 35, the icon identifying the photographing mode is added to each thumbnail and displayed, but instead of such a display, for example, when a specific thumbnail is selected, photographing mode information of the thumbnail image may be displayed.

As described above, according to the present embodiment, provided is an imaging apparatus including with an imaging unit for a wide angle image and an imaging unit for a narrow angle image, control is performed such that an imaging operation is performed in accordance with a first photographing mode in which a still image of a narrow angle or a wide angle is captured, a second photographing mode in which a moving image of a narrow angle or a wide angle is captured, a third photographing mode in which the still image of the narrow angle and the still image of the wide angle are captured simultaneously, and a fourth photographing mode in which the moving image of the wide angle and the still image of the narrow angle are captured simultaneously or the moving image of the narrow angle and the still image of the wide angle are captured simultaneously. Further, the photographing modes can be selected in accordance with a user setting thereof.

In other words, an imaging apparatus includes a first imaging unit that captures a narrow angle image, a second imaging unit that captures a wide angle image, a signal processing unit, a control unit, a manipulation input unit, and a recording unit, wherein the signal processing unit generates first still image data and first moving image data from a signal captured by the first imaging unit and generates second still image data and second moving image data from a signal captured by the second imaging unit, the control unit controls the first imaging unit, the second imaging unit, the signal processing unit, and the recording unit in accordance with a photographing mode input from the manipulation input unit, and the photographing mode includes a first photographing mode in which the first still image data or the second still image data is recorded in the recording unit, a second photographing mode in which the first moving image data or the second moving image data is recorded in the recording unit, a third photographing mode in which the second still image data is recorded in the recording unit while the first moving image data is being recorded or the first still image data is recorded in the recording unit while the second moving image data is being recorded, and a fourth photographing mode in which the first still image data and the second still image data are simultaneously recorded in the recording unit.

Accordingly, it is possible to provide an imaging apparatus with excellent usability capable of controlling a plurality of imaging units independently or simultaneously such that imaging is performed with a simple manipulation when a desired photographing mode is selected by the user setting.

Seventh Embodiment

Figure 36:
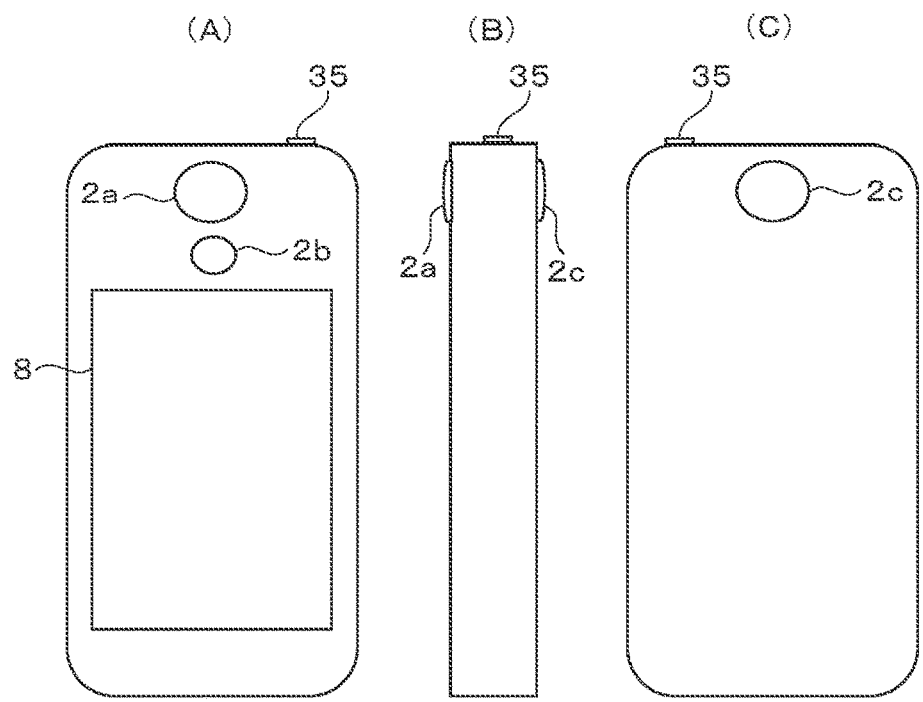
FIG. 36 is a schematic diagram of an imaging apparatus in a seventh embodiment.

FIG. 36 is a schematic diagram of an imaging apparatus in the present embodiment. In FIG. 36, (A) is a rear view, (B) is a right side view, and (C) is a front view. A display 8 integrated with a touch panel integrated is arranged on the back side of the imaging apparatus. A difference between the imaging apparatus of the present embodiment and the sixth embodiment lies in that a lens unit 2c is further added to the lens units 2a and 2b, and an imaging unit 3c is added to the imaging units 3a and 3b. In FIG. 36, the lens units 2a and 2c are super-wide angle lenses, and it is possible to generate a so-called spherical image by combining the images captured by the imaging units 3a and 3c. In the present embodiment, the images captured by the imaging units 3a and 3c are used as the wide angle image, and the image captured by the imaging unit 3b is used as the narrow angle image. The remaining parts are similar to those in the sixth embodiment, and description thereof is omitted.

Eighth Embodiment

Figure 37:
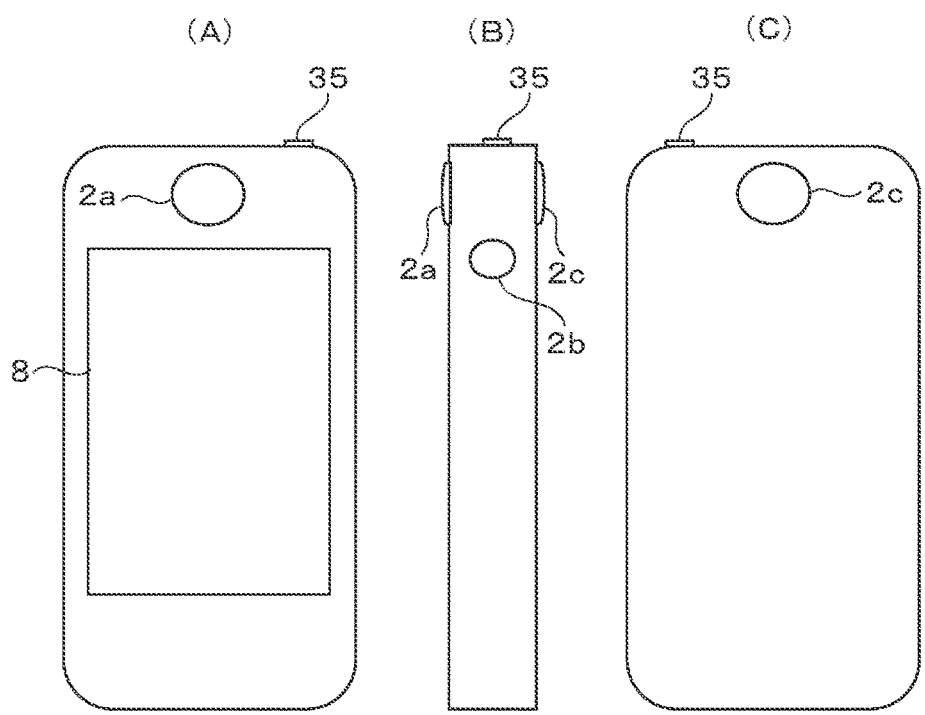
FIG. 37 is a schematic diagram of an imaging apparatus in an eighth embodiment.

FIG. 37 is a schematic diagram of an imaging apparatus in the present embodiment. In FIG. 37, (A) is a rear view, (B) is a right side view, and (C) is a front view, and similarly to FIG. 36, a display 8 integrated with a touch panel is arranged on the back side of the imaging apparatus.

Similarly to the seventh embodiment, in the present embodiment, a spherical image type imaging unit is used as an imaging unit for a wide angle image. A difference from the seventh embodiment lies in that the lens unit 2b is arranged on a side surface of a main body as illustrated in (B) of FIG. 37. According to the configuration of the present embodiment, the lens of the narrow angle imaging unit is substantially 90° with respect to the lens of the wide angle imaging unit, and thus there is an advantage in that it is easy to image a dead angle of the wide angle imaging unit through the narrow angle imaging unit, and it is unlikely for a photographer to be an obstacle to capturing of a wide angle image when imaging is performed by the wide angle imaging unit.

Figure 38:
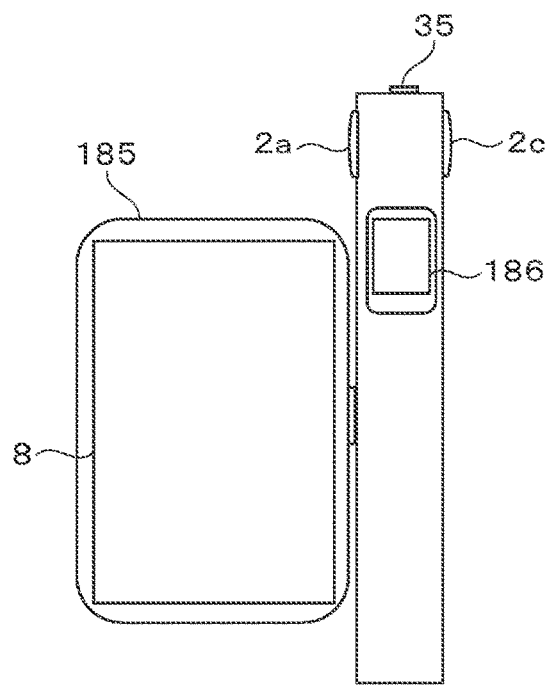
FIG. 38 is another schematic diagram of an imaging apparatus in the eighth embodiment.

Further, the display 8 may be movable. FIG. 38 is a side view illustrating a main body side viewed from a left side in which the display of FIG. 37 is movable, the display 8 is installed on a movable portion 185 and is rotated about 90° in a side direction. Since the display is movable as described above, the photographing manipulation is easy. Further, an electronic viewfinder 186 may be installed on the side surface of the main body. The lens unit 2b is arranged on an opposite side surface of the electronic viewfinder 186. The remaining parts are similar to those in the sixth embodiment, and description thereof is omitted.

Figure 39:
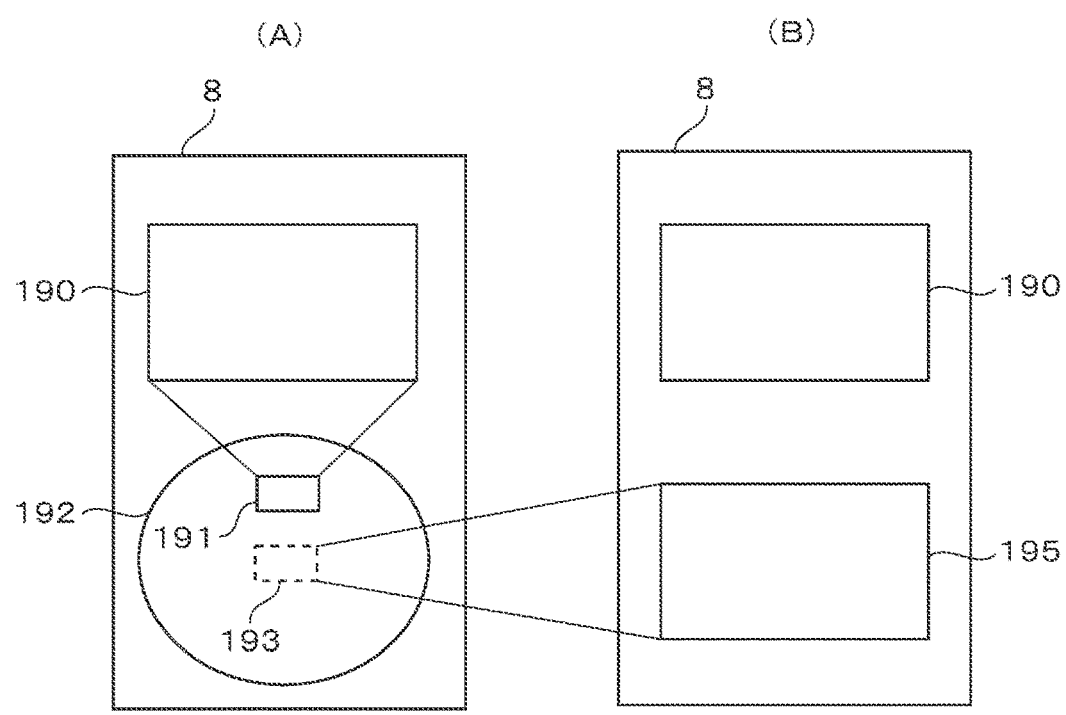
FIG. 39 is an explanatory diagram of a photographing mode screen display in the eighth embodiment.

FIG. 39 is an explanatory diagram of a photographing screen in the present embodiment. In the photographing mode in the present embodiment, it is desirable that display similar to the photographing mode described in the sixth embodiment be performed, but the 2-screen display illustrated in FIG. 39 may be performed. In (A) of FIG. 39, reference numeral 190 indicates a narrow angle image display region, reference numeral 192 indicates a spherical image display region and a wide angle image display region. A spherical image obtained by combining images captured by the imaging units 3a and 3c is displayed in the wide angle image display region. A narrow angle image captured by the imaging unit 3b is displayed in the narrow angle image display region 190. The display of the spherical image in the spherical image display region 192 can be converted into a video in which the spherical image is viewed from an arbitrary viewpoint through a drag manipulation. In the spherical image display region 192, when an image corresponding to the narrow angle image display region 190 is displayed, a region of a corresponding narrow angle image is displayed as a frame 191.

(B) of FIG. 39 illustrates a display example when the spherical image display region 192 of (A) of FIG. 39 is enlarged by the pinch-out manipulation, and for example, a region 193 of (A) of FIG. 39 is enlarged and displayed in the region 195 of (B) of FIG. 39.

Although the embodiments have been described above, the present invention is not limited to the above embodiments and includes various modifications. For example, the above embodiments have been described in detail in order to facilitate understanding of the present invention and are not necessarily limited to the configuration including all the components described above. Further, some components of a certain embodiment may be replaced with components of another embodiment, and components of another embodiment may be added to components of a certain embodiment as well. Further, addition, deletion, or replacement of other components may be performed on components of each embodiment.

REFERENCE SIGNS LIST

1 Imaging apparatus
2a, 2b, 2c Lens unit
3a, 3b, 3c Imaging unit 4 Interface circuit
5 Image signal processing circuit
6 Control circuit
7 Posture detecting unit
8 Display
9 Manipulation input unit
10 Recording/reproducing circuit
11 Recording medium
12 Memory
13 Position information input unit
14 Wireless communication unit
15 Encoding/decoding circuit
16 Microphone
17 Speaker
18 Proximity sensor
20 Video/audio signal processing circuit
31 Mode setting dial
32 Shutter button
33 Manipulation button
34 Moving image capturing button
35 Power switch
50 Image display unit
51 Narrow angle image region
52 Subject
53 Still image capturing mode icon
54 Moving image capturing mode icon
55 Moving image simultaneous capturing mode icon
56 Still image simultaneous capturing mode icon
92 Mode display button
93 Camera setting button
94 Screen switching button
140 Video display region
141 Input image of person part
142 Input image of background part
143 Distance histogram display region
144 Selection frame
145 Image display region
146 Image quality adjustment display
800 to 804 Setting item of first imaging unit
805 to 809 Setting item of second imaging unit
186 Electronic viewfinder
190 Narrow angle image display region
192 Spherical image display region
500 Still image capturing button
501, 502 Angle-of-view switching button
600 Moving image capturing button
601 Reproducing mode button
700 Moving image capturing end button

The invention claimed is:

1. An imaging apparatus, comprising:
a first imager configured to capture a narrow angle image, the first imager being arranged on a first surface side of the imaging apparatus;
a second imager configured to capture a wide angle image, the second imager being arranged on the first surface side of the imaging apparatus;
a third imager configured to capture an image, the third imager being arranged on a second surface side of the imaging apparatus which is opposed to the first surface side;
a signal processor configured to generate a first still image data or first moving image data from a signal captured by the first imager, a second still image data or second moving image data from a signal captured by the second imager and a third still image data or third moving image data from a signal captured by the third imager;
a display;
a manipulation input interface;
a recorder; and
a controller configured to control the first imager, the second imager, the third imager, the signal processor, the display and the recorder in accordance with a photographing mode input from the manipulation input interface,
wherein the photographing mode includes:
a first photographing mode in which the first still image data or the second still image data is recorded by the recorder,
a second photographing mode in which the first moving image data or the second moving image data is recorded by the recorder,
a third photographing mode in which the second still image data is recorded by the recorder while the first moving image data is being recorded or the first still image data is recorded by the recorder while the second moving image data is being recorded, and
a fourth photographing mode in which the first still image data and the second still image data are simultaneously recorded by the recorder,
wherein, in a case that the display mainly displays the narrow angle image captured by the first imager when the photographing mode is the first photographing mode or the second photographing mode, the controller is configured to control the display to display a first indication and a first icon with the mainly displayed narrow angle image, the first indication indicating a wide angle image region to be captured by the second imager and the first icon being for switching an image to be displayed by the display from the narrow angle image to the wide angle image,
wherein, in a case that the display mainly displays the wide angle image captured by the second imager when the photographing mode is the first photographing mode or the second photographing mode, the controller is configured to control the display to display a second indication and a second icon with the mainly displayed wide angle image, the second indication indicating a narrow angle image region to be captured by the first imager and the second icon being for switching an image to be displayed by the display from the wide angle image to the narrow angle image, and
wherein, in a case that the manipulation input interface receives an angle of view switching manipulation input at an arbitrary timing other than zoom manipulation input to vary a zoom magnification while combining and recording the first moving image data of the narrow angle image captured by the first imager or the second moving image data of the wide angle image captured by the second imager with the third moving image data when the photographing mode is the second photographing mode, the controller is configured to control the recorder to continue the recording while switching a moving image data to be combined and recorded with the third moving image data between the first moving image data and the second moving image data in response to the angle of view switching manipulation input, and
wherein, during combining and recording the first moving image data of the narrow angle image with the third moving image data, the controller is configured to control the display to display a thumbnail superimposed on the first moving image data, an angle of view of the thumbnail corresponding to an angle of view of the second moving image data, and the thumbnail being not recorded.

2. The imaging apparatus according to claim 1, wherein the photographing mode further includes a fifth photographing mode in which the first moving image data and the second moving image data are simultaneously recorded by the recorder.

3. The imaging apparatus according to claim 1,
wherein the first imager and the second imager are arranged to perform imaging in the same direction.

4. The imaging apparatus according to claim 3,
wherein the controller is configured to control to group and record a plurality of moving image data or a plurality of still image data which are captured in the third photographing mode or the fourth photographing mode.

5. The imaging apparatus according to claim 1,
wherein the controller is configured to control the display to replace an icon to be displayed between the first icon and the second icon in accordance with whether the display mainly displays the wide angle image captured by the second imager or the narrow angle image captured by the first imager.

6. An imaging method of an imaging apparatus, the imaging apparatus including a first imager configured to capture a narrow angle image, the first imager being arranged on a first surface side of the imaging apparatus; a second imager configured to capture a wide angle image, the second imager being arranged on the first surface side of the imaging apparatus; a third imager configured to capture an image, the third imager being arranged on a second surface side of the imaging apparatus which is opposed to the first surface side; a signal processor; a display; a manipulation input interface; a recorder; and a controller configured to control the first imager, the second imager, the third imager, the signal processor, the display and the recorder in accordance with a photographing mode input from the manipulation input interface, wherein the photographing mode includes: a first photographing mode in which the first still image data or the second still image data is recorded by the recorder, a second photographing mode in which the first moving image data or the second moving image data is recorded by the recorder, a third photographing mode in which the second still image data is recorded by the recorder while the first moving image data is being recorded or the first still image data is recorded by the recorder while the second moving image data is being recorded, and a fourth photographing mode in which the first still image data and the second still image data are simultaneously recorded by the recorder, the method comprising:

generating, by the signal processor, first still image data or first moving image data from a signal captured by the first imager and generate second still image data or second moving image data from a signal captured by the second imager;

in a case that the display mainly displays the narrow angle image captured by the first imager when the photographing mode is the first photographing mode or the second photographing mode, controlling, by the controller, the display to display a first indication and a first icon with the mainly displayed narrow angle image, the first indication indicating a wide angle image region to be captured by the second imager and the first icon being for switching an image to be displayed by the display from the narrow angle image to the wide angle image;

in a case that the display mainly displays the wide angle image captured by the second imager when the photographing mode is the first photographing mode or the second photographing mode, controlling, by the controller, the display to display a second indication and a second icon with the mainly displayed wide angle image, the second indication indicating a narrow angle image region to be captured by the first imager and the second icon being for switching an image to be displayed by the display from the wide angle image to the narrow angle image; and wherein, in a case that the manipulation input interface receives an angle of view switching manipulation input at an arbitrary timing other than zoom manipulation input to vary a zoom magnification while combining and recording the first moving image data of the narrow angle image captured by the first imager or the second moving image data of the wide angle image captured by the second imager with the third moving image data when the photographing mode is the second photographing mode, controlling, by the controller, the recorder to continue the recording while switching a moving image data to be combined and recorded with the third moving image data between the first moving image data and the second moving image data in response to the angle of view switching manipulation input wherein, during combining and recording the first moving image data of the narrow angle image with the third moving image data, controlling, by the controller, the display to display a thumbnail superimposed on the first moving image data, an angle of view of the thumbnail corresponding to an angle of view of the second moving image data, and the thumbnail being not recorded.

7. The imaging method according to claim 6,
wherein the photographing mode further includes a fifth photographing mode in which the first moving image data and the second moving image data are simultaneously recorded by the recorder.

8. The imaging method according to claim 6,
wherein the first imager and the second imager are arranged to perform imaging in the same direction.

9. The imaging method according to claim 8, further including controlling, by the controller, to group and record a plurality of moving image data or a plurality of still image data which are captured in the third photographing mode or the fourth photographing mode.

10. The imaging method according to claim 6, further including controlling, by the controller, the display to replace an icon to be displayed between the first icon and the second icon in accordance with whether the display mainly displays the wide angle image captured by the second imager or the narrow angle image captured by the first imager.

11. An imaging apparatus, comprising:
a first imager configured to capture a narrow angle image, the first imager being arranged on a first surface side of the imaging apparatus;
a second imager configured to capture a wide angle image, the second imager being arranged on the first surface side of the imaging apparatus;
a third imager configured to capture an image, the third imager being arranged on a second surface side of the imaging apparatus which is opposed to the first surface side;

a signal processor configured to generate a first still image data or first moving image data from a signal captured by the first imager, a second still image data or second moving image data from a signal captured by the second imager and a third still image data or third moving image data from a signal captured by the third imager;

a display;

a manipulation input interface;

a recorder; and a controller configured to control the first imager, the second imager, the third imager, the signal processor, the display and the recorder in accordance with a photographing mode input from the manipulation input interface, wherein, in a case that the manipulation input interface receives an angle of view switching manipulation input at an arbitrary timing other than zoom manipulation input to vary a zoom magnification while combining and recording the first moving image data of the narrow angle image captured by the first imager or the second moving image data of the wide angle captured by the second imager with the third moving image data, the controller is configured to control the recorder to continue the recording while switching a moving image data to be combined and recorded with the third moving image data between the first moving image data and the second moving image data in response to the angle of view switching manipulation input, and wherein, during combining and recording the first moving image data of the narrow angle image with the third moving image data, the controller is configured to control the display to display a thumbnail superimposed on the first moving image data, an angle of view of the thumbnail corresponding to an angle of view of the second moving image data, and the thumbnail being not recorded.

12. The imaging apparatus according to claim 11, wherein the thumbnail is a moving image.

13. The imaging apparatus according to claim 11, wherein the thumbnail is obtained by using the second moving image data.

14. An imaging method of an imaging apparatus, the imaging apparatus including a first imager configured to capture a narrow angle image, the first imager being arranged on a first surface side of the imaging apparatus; a second imager configured to capture a wide angle image, the second imager being arranged on the first surface side of the imaging apparatus; a third imager configured to capture an image, the third imager being arranged on a second surface side of the imaging apparatus which is opposed to the first surface side; a signal processor; a display; a manipulation input interface; a recorder; and a controller configured to control the first imager, the second imager, the third imager, the signal processor, the display and the recorder in accordance with a photographing mode input from the manipulation input interface, the method comprising:

generating, by the signal processor, a first still image data or first moving image data from a signal captured by the first imager, a second still image data or second moving image data from a signal captured by the second imager and a third still image data or third moving image data from a signal captured by the third imager;

wherein, in a case that the manipulation input interface receives an angle of view switching manipulation input at an arbitrary timing other than zoom manipulation input to vary a zoom magnification while combining and recording the first moving image data of the narrow angle image captured by the first imager or the second moving image data of the wide angle image captured by the second imager with the third moving image data, controlling, by the controller, the recorder to continue the recording while switching a moving image data to be combined and recorded with the third moving image data between the first moving image data and the second moving image data in response to the angle of view switching manipulation input, and wherein, during combining and recording the first moving image data of the narrow angle image with the third moving image data, controlling, by the controller, the display to display a thumbnail superimposed on the first moving image data, an angle of view of the thumbnail corresponding to an angle of view of the second moving image data, and the thumbnail being not recorded.

15. The imaging apparatus according to claim 14, wherein the thumbnail is a moving image.

16. The imaging apparatus according to claim 14, wherein the thumbnail is obtained by using the second moving image data.

* * * * *